United States Patent
Arahira

(10) Patent No.: US 8,242,435 B2
(45) Date of Patent: Aug. 14, 2012

(54) QUANTUM ENTANGLED PHOTON PAIR GENERATING DEVICE

(75) Inventor: Shin Arahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 156 days.

(21) Appl. No.: 12/923,477

(22) Filed: Sep. 23, 2010

(65) Prior Publication Data

US 2011/0073783 A1 Mar. 31, 2011

(30) Foreign Application Priority Data

Sep. 30, 2009 (JP) ................................. 2009-227981

(51) Int. Cl.
*G21K 5/04* (2006.01)

(52) U.S. Cl. ....................................................... 250/251
(58) Field of Classification Search .................... 250/251
See application file for complete search history.

(56) References Cited

U.S. PATENT DOCUMENTS 7,211,812 B2 5/2007 Takeuchi

FOREIGN PATENT DOCUMENTS

JP 2003-228091 A 8/2003
JP 2005-258232 A 9/2005

OTHER PUBLICATIONS

H.C. Lim, A. Yoshizawa, H. Tsuchida, and K. Kikuchi, "Stable source of high quality telecom-band polarization-entangled photon-pairs based on a single, pulse- pumped, short PPLN waveguide", Optics Express, vol. 16, No. 17, pp. 12460-12468, 2008.

*Primary Examiner* — Michael Maskell
*Assistant Examiner* — Hanway Chang
(74) *Attorney, Agent, or Firm* — Rabin & Berdo, P.C.

(57) ABSTRACT

Excitation light is split into two components with mutually orthogonal polarization. One component is fed clockwise and the other component is fed counterclockwise into a polarization maintaining loop. An optical conversion generation unit including two second-order nonlinear optical media disposed on opposite sides of a half-wave plate in the loop generates up-converted light from each excitation component by second harmonic generation, and generates down-converted light from the up-converted light by spontaneous parametric down conversion. A polarization manipulation unit manipulates the polarization direction of at least one of the excitation or down-converted components. The clockwise and counterclockwise components of the down-converted light are recombined and output as quantum entangled photon pairs having substantially the same wavelength as the excitation light. The optical components can be optimized for operation at this wavelength without the need to consider the shorter wavelength of the up-converted light.

14 Claims, 14 Drawing Sheets

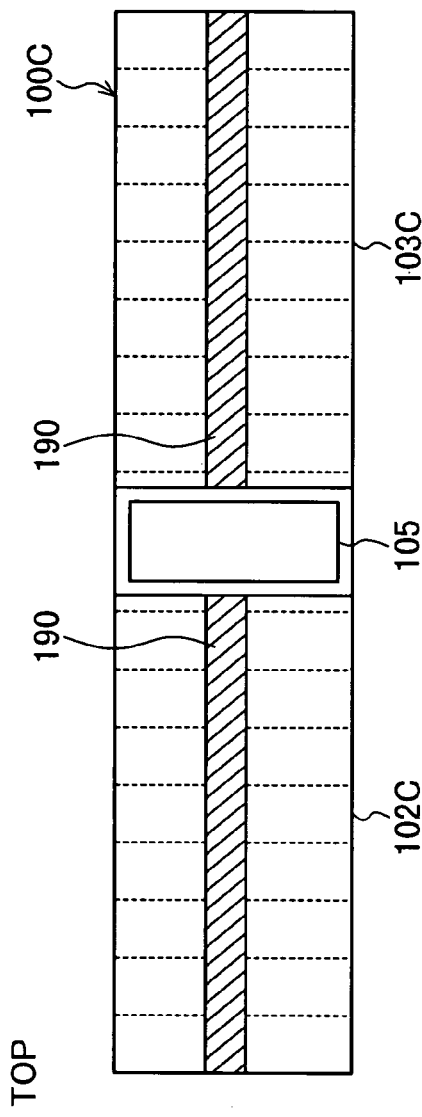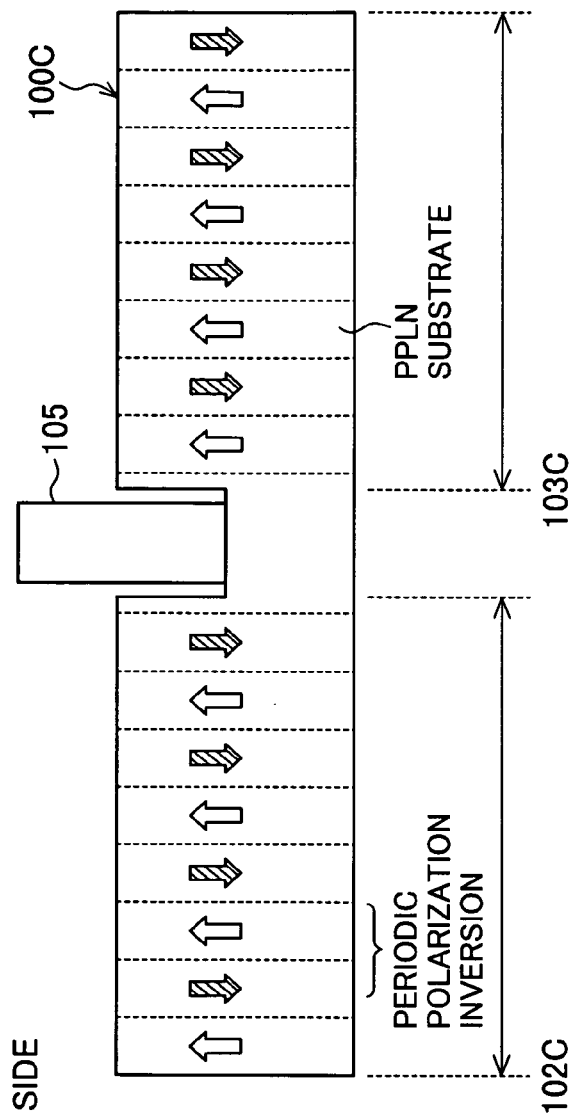
FIG.7A
FIG.7B

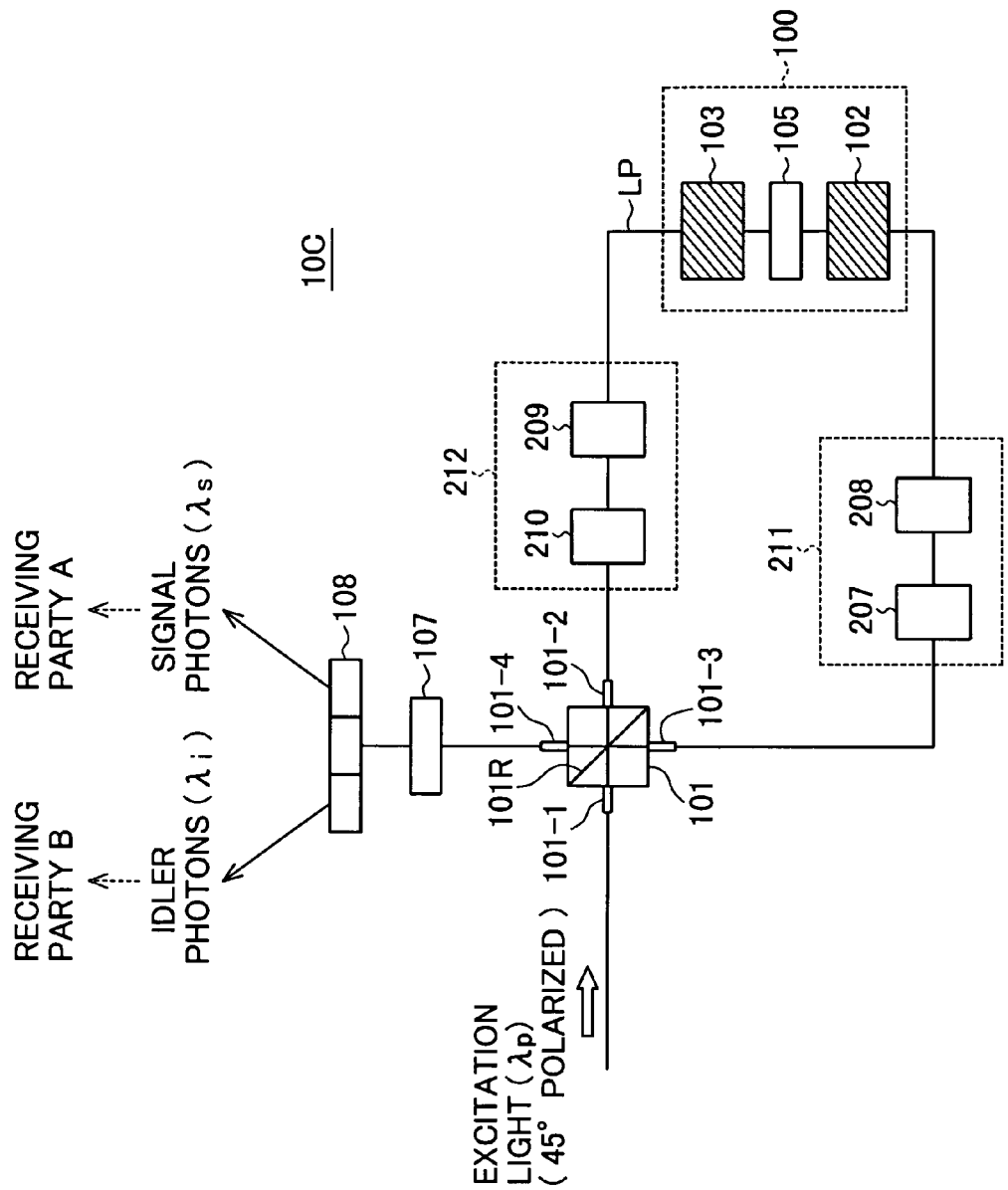

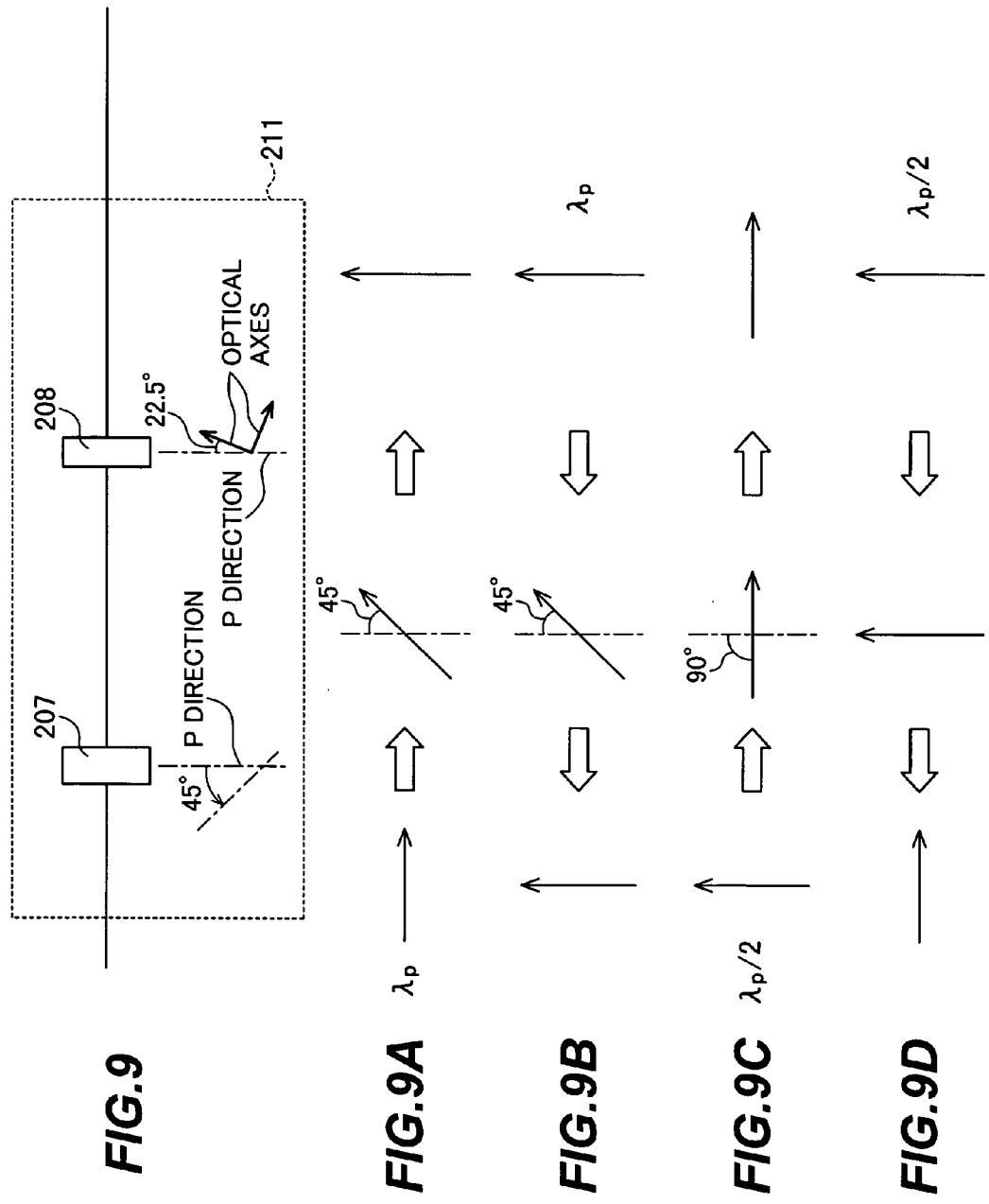

QUANTUM ENTANGLED PHOTON PAIR GENERATING DEVICE

BACKGROUND OF THE INVENTION

1. Field of the Invention

The present invention relates to a device for generating entangled photon pairs. The device is applicable to quantum cryptographic systems, quantum computers, and other quantum information communication systems that exploit quantum correlation of photon pairs.

2. Description of the Related Art

In recent years, information technology has reached the quantum mechanical level. Quantum cryptography and quantum computing are attracting attention. In particular, quantum cryptography, in which the security of an encryption key is guaranteed by the principles of quantum mechanics, is now regarded as the ultimate secure cryptographic communication system and has been under active research and development.

A source of quantum correlated, that is, entangled photon pairs is an essential element for realizing advanced quantum information communication systems taking advantage of the quantum nonlocality of photon pairs.

One known method for generating quantum entangled photon pairs uses spontaneous parametric down-conversion (SPDC) in a second-order nonlinear optical medium.

In U.S. Pat. No. 7,211,812 (Japanese Patent Application Publication No. 2003-228091, now Japanese Patent No. 4098530), Takeuchi describes a quantum entangled photon pair generating device using $\beta$-$BaB_2O_4$ (BBO) crystals as second-order nonlinear optical media. Two BBO crystals are aligned in series with a half-wave plate centered between them. Input of linearly-polarized excitation light (pump light) with a wavelength of 351.1 nm produces spontaneous parametric down conversion in the BBO crystals, generating quantum correlated photon pairs with a wavelength equal to twice the wavelength of the excitation light (equal to 702.2 nm). The two photons in each pair are referred to as the signal photon and the idler photon. The half-wave plate rotates the polarization of the photons generated in the first BBO crystal by 90°. When the intensity of the excitation light is sufficiently weak and the probability of the occurrence of spontaneous parametric down conversion in both BBO crystals simultaneously is negligible, the device outputs a signal photon beam and a spatially separated idler photon beam in which each photon in each beam has an equal probability of having been generated in each of the two BBO crystals, and its polarization state is a superposition of two states with mutually orthogonal polarization planes. The signal and idler photons in each pair are said to be polarization entangled in that both give the same result when their polarization is measured in the same way.

Many other systems using similar structures to generate quantum entangled photon pairs with wavelengths in the 700 nm to 800 nm band have been reported. Generating entangled photon pairs with wavelengths in the 1550-nm band, which is the minimum absorption loss wavelength band of optical fibers, would be very useful in anticipation of long-haul quantum information communication systems.

In Japanese Patent Application Publication No. 2005-258232, Inoue describes a 1550-nm quantum entangled photon pair generating device using periodically poled lithium niobate (PPLN) waveguides as second-order nonlinear optical media. This device has a fiber loop structure incorporating two PPLN waveguides and a polarizing beam splitter (PBS). The two PPLN waveguides are displaced so that their optical axes are mutually orthogonal. A femtosecond excitation light pulse with a wavelength of 775 nm and 45° plane polarization is input through the PBS, which splits it into photons having equal probabilities of being aligned in polarization with the axis of each PPLN waveguide. Like the BBO crystals described above, the PPLN waveguides generate quantum correlated photon pairs by spontaneous parametric down conversion, but the signal and idler photons have wavelengths of 1550 nm.

A 1550-nm wavelength quantum entangled photon pair generating device using a PBS and a polarization maintaining optical fiber loop with a single PPLN element has been described by Lim et al. in *Stable source for high quality telecom-band polarization-entangled photon pairs based on a single, pulse-pumped, short PPLN waveguide* (Optic Express, vol. 16, No. 17, pp. 12460 to 12468, 2008). The polarization maintaining optical fiber loop also includes a fusion splice with a 90° twist. The PPLN waveguide generates quantum correlated photon pairs including signal photons with a wavelength of 1542 nm and idler photons with a wavelength of 1562 nm by spontaneous parametric down conversion. When the intensity of the excitation light is sufficiently weak, the state of each quantum correlated photon pair output from the PBS is a superposition of a state produced by clockwise travel around the loop and an orthogonally polarized state produced by counterclockwise travel.

The essential components of these known devices are a second-order nonlinear optical medium in which the SPDC process takes place, and a source of excitation light with a wavelength approximately half the wavelength of the desired quantum entangled photon pairs. In order to obtain quantum entangled photon pairs with wavelengths in the 1550 nm band for use in optical fiber communication, a 775-nm excitation light source is needed. This leads to the following problems.

The devices described by Inoue and Lim et al. require a PBS specially designed to operate similarly at both of two greatly differing wavelengths, e.g., 775 nm and 1550 nm. The lenses and other optical elements needed for internal and external optical coupling must also be specially designed. For example, the focal length of a lens must be selected to achieve optical coupling at both the 775-nm and 1550-nm wavelengths. Anti-reflection coatings that prevent reflection at both wavelengths are also needed. Thus the known art requires optical components capable of operating with excitation light and quantum correlated photon pairs having wavelengths that differ by a factor of two.

Generally speaking, a device having equally good performance characteristics for light with greatly differing wavelengths cannot be expected to have characteristics as good as a device optimized for one of the wavelengths. More specifically, the polarization extinction ratio of a PBS and the coupling efficiency of a lens system designed for operation at both 775 nm and 1550 nm are generally inferior to the polarization extinction ratio of a PBS and the coupling efficiency of a lens system optimized for just one of these wavelengths, e.g., 1550 nm. The use of components designed to operate at both wavelengths accordingly entails an excessive loss of both input excitation light and the quantum correlated photon pairs generated for output.

A quantum information communication system using quantum entangled photon pairs deals with extremely weak light to begin with, generating single photons or photon pairs or still smaller states and transmitting an average of one photon pair or less per time slot. A structure that leads to excessive loss of light critically impairs system performance, and calls for improvement.

It would be preferable for a system that generates entangled photon pairs in, for example, the 1550-nm band to use optical components designed just for operation in the 1550-nm band, including not only passive optical components such as the PBS and lens systems mentioned above but also active components such as light sources. Such optical components are commercially available at comparatively low prices and have proven high reliability, and the active components have excellent controllability.

SUMMARY OF THE INVENTION

An object of the present invention is to provide a quantum entangled photon pair producing device capable of generating quantum entangled photon pair output of high purity by using simple, readily available optical devices rather than specially designed ones.

Another object of the invention is to prevent excessive loss of light.

The invention provides a quantum entangled photon pair generating device including a polarization maintaining loop path. A loop input unit receives excitation light from an external source, separates the excitation light into first and second excitation light components with mutually orthogonal polarization planes, feeds the first excitation light component clockwise into the polarization maintaining loop path, and feeds the second excitation light component counterclockwise into the polarization maintaining loop path. An optical conversion generation unit disposed in the polarization maintaining loop path generates up-converted light from each excitation light component by second harmonic generation, and generates down-converted light from the up-converted light by spontaneous parametric down-conversion. The optical conversion generation unit includes a pair of second-order nonlinear optical media disposed on opposite sides of a half-wave plate, which rotates the plane of polarization of the excitation light and the down-converted light. Up-converted light generated in one second-order nonlinear optical medium passes through the half-wave plate without polarization rotation and generates down-converted light in the other second-order nonlinear optical medium. A polarization manipulation unit manipulates the polarization direction of at least one of the excitation light or down-converted light components. The down-converted light propagating in the clockwise and counterclockwise directions on the polarization maintaining loop path is received by a loop output unit that recombines the clockwise and counterclockwise propagating components that have not passed through the half-wave plate in the optical conversion generation unit because they were generated from up-converted light that had already passed through the half-wave plate, and outputs the combined light. The combined down-converted light includes polarization entangled photon pairs having substantially the same wavelength as the excitation light.

The loop input unit and loop output unit may be combined into a single polarization splitting-combining module.

Since the input excitation light and the output down-converted light have substantially the same wavelength, the optical components of the quantum entangled photon pair generating device can be designed for operation at this wavelength. It is unnecessary to provide guaranteed coupling performance or loss performance at the shorter wavelength of the up-converted light, which is used only within the second-order nonlinear optical media. Since the quantum entangled photon pair generating device can be fabricated from standard optical components optimized for operation at the excitation wavelength, it can be manufactured at a low cost, and can provide output of high purity with comparatively low loss.

BRIEF DESCRIPTION OF THE DRAWINGS

In the attached drawings:

FIG. 7A is a schematic top plan view illustrating an exemplary alternative structure of the optical conversion generation unit in FIG. 1;

FIG. 7B is a schematic side view of the exemplary structure in FIG. 7A;

FIG. 8 schematically illustrates the structure of a polarization entangled photon pair generating device in a second embodiment of the invention;

FIG. 9 and FIGS. 9A to 9D schematically illustrate polarization rotation and optical axis relationships in the nonreciprocal polarization converters in FIG. 8;

FIG. 12 and FIGS. 12A to 12D schematically illustrate polarization rotation and optical axis relationships in the polarization converter in FIG. 11;

DETAILED DESCRIPTION OF THE INVENTION

Figure 1:
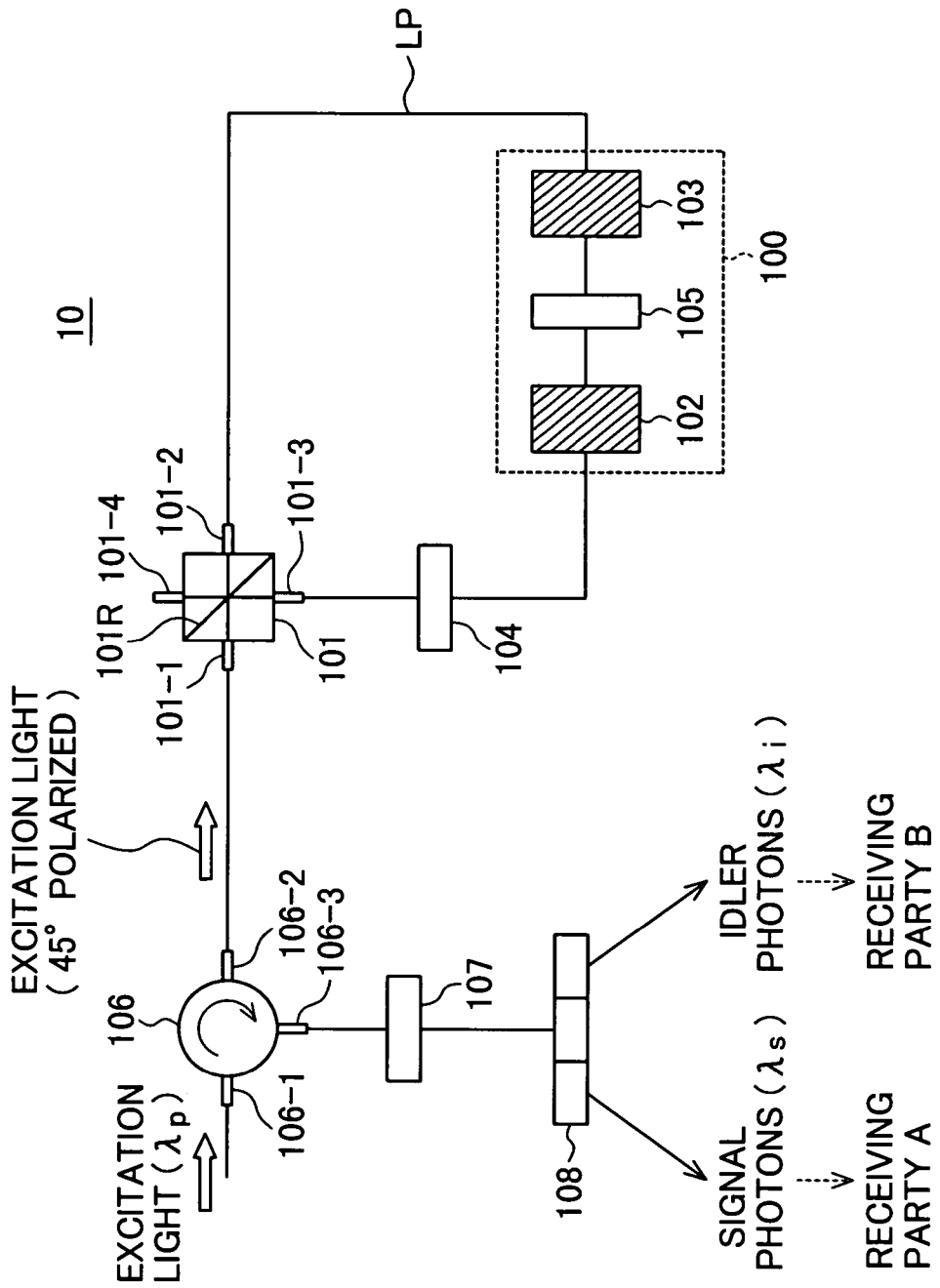
FIG. 1 schematically illustrates the structure of a polarization entangled photon pair generating device in a first embodiment of the invention.

Embodiments of the invention will now be described with reference to the attached drawings, in which like elements are indicated by like reference characters.

First Embodiment

Referring to FIG. 1, the quantum entangled photon pair generating device 10 in the first embodiment includes at least a polarization splitting-combining module 101, a first half-wave plate 104, and an optical conversion generation unit 100. Two of the input and output ports of the polarization splitting-combining module 101, the first half-wave plate 104, and the optical conversion generation unit 100 constitute a Sagnac interferometer optical loop LP. The optical conversion generation unit 100 includes a first second-order nonlinear optical medium 102, a second half-wave plate 105, and a second second-order nonlinear optical medium 103, connected in cascade in this order. The quantum entangled photon pair generating device 10 also includes an optical circulator 106, an optical low-pass filter 107, and a wavelength division multiplexing (WDM) filter 108, as optical input/output devices for input of excitation light to the optical loop LP and output of signal and idler photons from the optical loop LP.

The optical loop LP is preferably a polarization maintaining optical system. Accordingly, the relationships among the optical axes of the polarization splitting-combining module 101, first and second second-order nonlinear optical media 102, 103, and first and second half-wave plates 104, 105 require particular attention.

The optical loop LP may be formed with polarization-maintaining optical fiber, or with free space optics employing only lenses and mirrors. In a fiber loop, if some of the optical components have attached pigtails of conventional optical fiber lacking the polarization maintaining property, a pseudo-polarization-maintaining optical system can still be constructed by using additional optical devices such as polarization controllers.

The vacuum wavelength of the input excitation light will be denoted $\lambda_p$. This wavelength $\lambda_p$ is near the desired wavelengths of the quantum entangled photon pairs, e.g., near 1550 nm for use in 1550-nm optical communication systems.

The wavelengths $\lambda_p$, $\lambda_s$, and $\lambda_i$ of the input excitation light, signal photon, and idler photon, satisfy the following equation (1) corresponding to the energy conservation law, where both $\lambda_s$ and $\lambda_i$ are wavelengths in vacuum.

$$\frac{2}{\lambda_p} = \frac{1}{\lambda_s} + \frac{1}{\lambda_i} \quad (1)$$

The polarization splitting-combining module 101 has a first input/output port 101-1 coupled to a second input/output port 106-2 of the optical circulator 106, a second input/output port 101-2 disposed opposite the first input/output port 101-1 and coupled to an end of the second second-order nonlinear optical medium 103, a third input/output port 101-3 coupled to an end of the first half-wave plate 104, and a fourth input/output port 101-4 disposed opposite the third input/output port 101-3. No essential light is input to or output from the fourth input/output port 101-4 in the first embodiment, so there is no need to connect optical signal input/output interface devices, such as an optical fiber pigtail or an optical connector. The fourth input/output port 101-4 is shown only for convenience of description. This is also true in the third embodiment. The fourth input/output port 101-4 is used in the second and fourth embodiments.

The optical circulator 106 has a first input port 106-1 for receiving input excitation light with wavelength $\lambda_p$, a second input/output port 106-2 for output of the light received at the first input port 106-1 to the first input/output port 101-1 of the polarization splitting-combining module 101, and a third output port 106-3 for output of the light received at the second input/output port 106-2.

The polarization splitting-combining module 101 and the optical circulator 106 must provide assured operation at wavelengths equal to or near $\lambda_p$, including $\lambda_s$, and $\lambda_i$, but need not operate correctly at $\lambda_p/2$ or wavelengths near $\lambda_p/2$. If the excitation wavelength $\lambda_p$ is 1550 nm, for example, a commercially available 1550-nm polarization splitting and combining module and a commercially available 1550-nm optical circulator may be used. Devices guaranteed to operate at wavelengths of both $\lambda_p$ and $\lambda_p/2$, as required by Inoue and by Lim et al., are unnecessary.

The components of light entering the polarization splitting-combining module 101 are defined in terms of the direction of oscillation of the electric field vector of the light with respect to the plane of incidence of the light on the polarization selective reflecting surface of the polarization splitting-combining module. The incident light is said to be p-polarized if its electric field vector oscillates parallel to this incidence plane, and s-polarized if its electric field vector oscillates perpendicular to this incidence plane. Incident light may include both p-polarized and s-polarized components.

In the polarization splitting-combining module 101, the p-polarized component of light input to the first input/output port 101-1 is output from the second input/output port 101-2, and the s-polarized component is output from the third input/output port 101-3. The p-polarized component of light input to the second input/output port 101-2 is output from the first input/output port 101-1, and the s-polarized component of light input to the third input/output port 101-3 is output from the fourth input/output port 101-4.

The polarization splitting-combining module 101 may be a commercially available thin-film polarizing beam splitter, but the invention is not limited to this type of device. For example, a birefringent polarizing prism may be used instead.

The input excitation light with a wavelength of $\lambda_p$ is input to the first input port 106-1 of the optical circulator 106, output from the second input/output port 106-2, input to the first input/output port 101-1 of the polarization splitting-combining module 101, and split into a p-polarized component which is output from the second input/output port 101-2 and an s-polarized component which is output from the third input/output port 101-3.

In the first embodiment, the optical intensities of the p-polarized component and the s-polarized component must be identical. Accordingly, the excitation light input to the first input/output port 101-1 of the polarization splitting-combining module 101 must be polarized so that the intensity ratio of its p-polarized and s-polarized components is 1:1. Such input excitation light will be referred to as 45° polarized excitation light. This excitation light may be prepared by inserting a polarization controller at a position preceding the first input port 106-1 of the optical circulator 106 to assure that the excitation light input to the first input/output port 101-1 of the polarization splitting-combining module 101 includes only light that is linearly polarized at a 45° angle with respect to the p- and s-polarization directions in the polarization splitting-combining module 101.

Each of the half-wave plates 104, 105 has mutually orthogonal fast and slow axes that produce an optical phase difference of π radians between the components of the light of wavelength $\lambda_p$ polarized parallel to the two axes. In the description below, unless otherwise noted, the term '1/n- wave plate' (n=2, 3, 4, . . . ) will mean a plate producing a phase difference of 1/n at the wavelength $\lambda_p$ of the excitation light.

Figure 2:
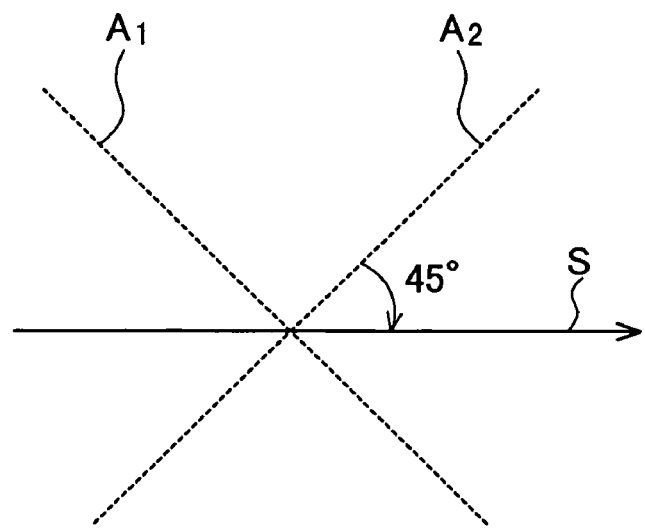
FIG. 2 illustrates the relationship between the polarization direction of excitation light output from the third input/output port of the polarization splitting-combining module and the optical axes of the first half-wave plate in FIG. 1.

The first half-wave plate 104 is aligned as shown in FIG. 2 so that its fast and slow axes $A_1$, $A_2$ are at 45° angles to the polarization direction S of the s-polarized component of the excitation light output from the third input/output port 101-3 of the polarization splitting-combining module 101. The polarization direction of the excitation light output from the third input/output port 101-3 is rotated by 90° by passage through the first half-wave plate 104 to match the polarization direction of the p-polarized component. The optical devices in the optical loop LP are disposed so that this polarization direction matches the optical axis direction (Z-axis direction in the example in the first embodiment) of the first and second-order nonlinear optical media 102, 103.

The first and second second-order nonlinear optical media 102, 103 are nonlinear optical media, such as PPLN media, having a second-order nonlinear optical effect. Upon reception of input excitation light with a wavelength of $\lambda_p$, they perform second harmonic generation (SHG) and generate light, referred to as intermediate SHG light or simply as SHG light below, with a wavelength ($\lambda_p/2$) equal to half the input wavelength.

Each of the first and second second-order nonlinear optical media 102, 103 receives the SHG light generated by the other one of the two second-order nonlinear optical media 102, 103 and uses the SHG light as seed light for an SPDC process that generates quantum correlated photon pairs, each pair consisting of a signal photon with a wavelength $\lambda_s$ and an idler photon with a wavelength $\lambda_i$.

In the description of the operation of the first embodiment, for convenience, the excitation light input to the two second-order nonlinear optical media 102, 103, the intermediate SHG light generated therein, and the desired SPDC correlated signal and idler photon pairs are all linearly polarized in the same direction. When PPLN waveguides are used as the second-order nonlinear optical media 102 and 103, for example, this alignment can be obtained by use of the PPLN $d_{33}$ second-order nonlinear optical coefficient for the SHG and SPDC processes, the excitation light input to the PPLN crystals to generate the intermediate SHG light and the SHG light input to the PPLN crystals to generate the entangled photon pairs by SPDC both being linearly polarized in the Z-axis direction of the PPLN crystals, so that the signal and idler photons are also polarized in the Z-axis direction of the PPLN crystal from which they are output.

Figure 3:
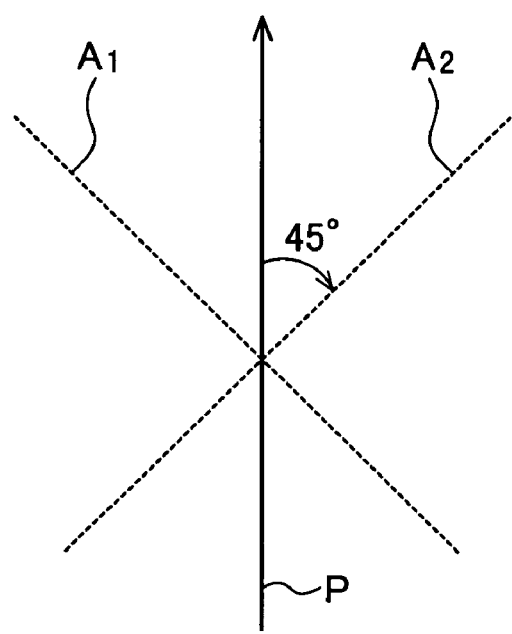
FIG. 3 illustrates relationships between the polarization direction of excitation light output from the second input/output port of the polarization splitting-combining module and the optical axes of components of the optical conversion generation unit in FIG. 1.

For this exemplary use of the $d_{33}$ second-order nonlinear optical coefficient, the optical axes of the first and second second-order nonlinear optical media 102, 103 and the second half-wave plate 105 disposed between them are arranged as shown schematically in FIG. 3. The Z-axes of the first and second second-order nonlinear optical media 102, 103 are aligned with the polarization direction P (p-polarization direction) of the excitation light output from the second input/output port 101-2. The optical axes $A_1$, $A_2$ of the second half-wave plate 105 are at 45° angles to this direction P. Accordingly, when the input excitation light and transient signal and idler photons (described below) are output from one of the second-order nonlinear optical media 102 and 103, polarized in its Z-axis direction, to the second half-wave plate 105, they are converted from polarized light to s-polarized light in the second half-wave plate 105 before entering the other of the first and second second-order nonlinear optical media 102, 103.

The optical low-pass filter 107 removes the $\lambda_p/2$ wavelength component of the light output from the third output port 106-3 of the optical circulator 106, thereby removing the intermediate SHG light generated in the first and second second-order nonlinear optical media 102, 103. Ideally, in the first embodiment the optical low-pass filter 107 is transparent only to the signal photon component with wavelength $\lambda_s$ and the idler photon component with wavelength $\lambda_i$, and not to the excitation light component with wavelength $\lambda_p$, for a reason that will be described below.

Of the light that passes through the optical low-pass filter 107, the WDM filter 108 separates at least the signal photon component with wavelength $\lambda_s$ and the idler photon component with wavelength $\lambda_i$ and transmits them on separate optical paths. A conventional wavelength division multiplexing filter of the arrayed waveguide grating (AWG) type, transmitting at least the $\lambda_s$ and $\lambda_i$ wavelength components representing the signal and idler photons, may be used as the WDM filter 108.

The signal photon and idler photon wavelength components transmitted through the WDM filter 108 are carried over the optical transmitting paths of, for example, an optical fiber communication network to respective receiving parties A and B. The receiving parties A and B then perform simultaneous measurement and other operations to communicate information by a known quantum information communication protocol.

The operation of the quantum entangled photon pair generating device 10 in the first embodiment will be described on the assumption that PPLN crystals are used as the first and second second-order nonlinear optical media 102, 103, and that the component corresponding to their $d_{33}$ second-order nonlinear optical coefficient is used for the SHG and SPDC processes.

Excitation light with wavelength $\lambda_p$ is injected from the second and third input/output ports 101-2, 101-3 of the polarization splitting-combining module 101 into the optical loop LP as p-polarized and s-polarized components of identical intensities. The p-polarization direction corresponds to the Z-axis of the PPLN crystals in the first and second second-order nonlinear optical media 102, 103.

First, the process that takes place as the p-polarized excitation light output from the second input/output port 101-2 propagates on the optical loop LP in the clockwise direction will be described.

Input of the excitation light causes the second second-order nonlinear optical medium (PPLN crystal) 103 to generate intermediate SHG light as seed light. Quantum correlated photon pairs consisting of a signal photon and an idler photon are generated from some of this intermediate SHG light in the same PPLN crystal (the second second-order nonlinear optical medium 103) by the SPDC process. These photon pairs will be referred to as transient signal and idler photons, or simply as transient light, because they do not become part of the final output.

The light output from the second second-order nonlinear optical medium 103 includes residual excitation light, intermediate SHG light, and transient signal and idler photons, all of which are p-polarized light, polarized in the Z-axis direction of the PPLN crystal.

The excitation light, intermediate SHG light, and transient signal and idler photons then pass through the second half-wave plate 105. The excitation light and the transient signal and idler photons, which have wavelengths equal or nearly equal to $\lambda_p$, have their planes of polarization rotated by substantially 90°, so they enter the first second-order nonlinear optical medium 102 as s-polarized components.

The intermediate SHG light, which has a wavelength $\lambda_p/2$, receives a phase shift of one wavelength from the second half-wave plate 105, so its polarization is not rotated. Accordingly, the intermediate SHG light is input to the first second-order nonlinear optical medium 102 as a p-polarized component.

In passage through the first second-order nonlinear optical medium 102, the excitation light and the transient signal and idler photons do not trigger the generation of new SHG light because of their s-polarization, and thus there is no subsequent generation of transient signal and idler photons by the SPDC process within the first second-order nonlinear optical medium 102.

The intermediate SHG light entering the first second-order nonlinear optical medium 102 as p-polarized light, however, undergoes the SPDC process, generating new signal and idler photons that will become part of the final correlated photon pair output.

As a result, the first second-order nonlinear optical medium 102 outputs two orthogonally polarized light groups: an s-polarized group including the excitation light and the transient signal and idler photons generated in the second second-order nonlinear optical medium 103, and a p-polarized group including the intermediate SHG light generated in the second second-order nonlinear optical medium 103 and the desired signal and idler photons generated in the first second-order nonlinear optical medium 102.

After leaving the first second-order nonlinear optical medium 102, these s- and p-polarized light components pass through the first half-wave plate 104 and enter the third input/output port 101-3 of the polarization splitting-combining module 101. In passage through the first half-wave plate 104, the polarization planes of all components except the intermediate SHG light component are rotated by 90°.

The input excitation light and the transient signal and idler photons generated in the second second-order nonlinear optical medium 103 are input to the third input/output port 101-3 as p-polarized components and output from the fourth input/output port 101-4, which is not used in the first embodiment. The desired signal and idler photons generated in the first second-order nonlinear optical medium 102 are input to the third input/output port 101-3 as s-polarized components and output from the first input/output port 101-1. If the wavelength dependency of the polarization splitting-combining module 101 is ignored, the intermediate SHG light is output from the fourth input/output port 101-4.

Accordingly, the excitation light propagating in the clockwise direction around the optical loop LP gives rise to desired correlated photon pairs consisting of s-polarized signal and idler photons which are output from the first input/output port 101-1, while the excitation light itself, and the transient light and intermediate SHG light generated in the second second-order nonlinear optical medium 103, are output form the fourth input/output port 101-4.

Next, the processes that take place as the excitation light output from the third input/output port 101-3 as s-polarized light propagates in the counterclockwise direction around the optical loop LP will be described.

This excitation light first passes through the first half-wave plate 104, in which it undergoes a polarization rotation of 90°, becoming a p-polarized component.

Like the excitation light propagating clockwise on the loop LP, the excitation light propagating counterclockwise triggers SHG and then SPDC processes in the first second-order nonlinear optical medium 102, producing intermediate SHG light and quantum correlated photon pairs consisting of transient signal and idler photons.

The counterclockwise-propagating light, now including excitation light, intermediate SHG light, and transient light, is all output from the first second-order nonlinear optical medium 102 as p-polarized light, but then passes through the second half-wave plate 105, which rotates the polarization of the excitation light and transient light by 90°. Accordingly, these components become s-polarized light while the intermediate SHG light remains p-polarized.

The s-polarized excitation light and transient light pass through the second second-order nonlinear optical medium 103 without triggering the SHG and SPDC processes, so they produce no additional SHG light or transient signal and idler photons.

The p-polarized intermediate SHG light, however, triggers an SPDC process, producing new signal and idler photons that will become another part of the desired output of quantum correlated photon pairs.

Accordingly, the second second-order nonlinear optical medium 103 outputs the counterclockwise-propagating excitation light and the transient light generated in the first second-order nonlinear optical medium 102 as s-polarized components, and the counterclockwise-propagating intermediate SHG light and the desired signal and idler photon pairs generated in the second second-order nonlinear optical medium 103 as p-polarized components.

The counterclockwise light output from the second second-order nonlinear optical medium 103 enters the second input/output port 101-2 of the polarization splitting-combining module 101. The s-polarized excitation light and transient light are output from the unused fourth input/output port 101-4. The p-polarized desired signal and idler photon pairs are output from the first input/output port 101-1. If the wavelength dependency of the polarization splitting-combining module 101 is ignored, the p-polarized intermediate SHG light is also output from the first input/output port 101-1.

Accordingly, as the input excitation light propagates in the counterclockwise direction around the optical loop LP, the desired p-polarized signal and idler photon pairs and the p-polarized intermediate SHG light generated in the first second-order nonlinear optical medium 102 are output from the first input/output port 101-1, while the s-polarized input excitation light and the s-polarized transient signal and idler photon pairs are output from the fourth input/output port 101-4.

As in the technique described by Lim et al., photons travel clockwise and counterclockwise around the optical loop LP with equal probability, and when the intensity of the excitation light is sufficiently weak, the polarization state of each signal-idler photon pair output from the first input/output port 101-1 is a superimposition of a p-polarized state produced by clockwise travel and an s-polarized state produced by counterclockwise travel. Although each photon may show either one of the two states when its polarization is measured, the signal and idler photons both show the same state if their polarization is measured simultaneously in the same way. The quantum entangled photon pair generating device 10 therefore generates polarization entangled photon pairs.

Figure 4A:
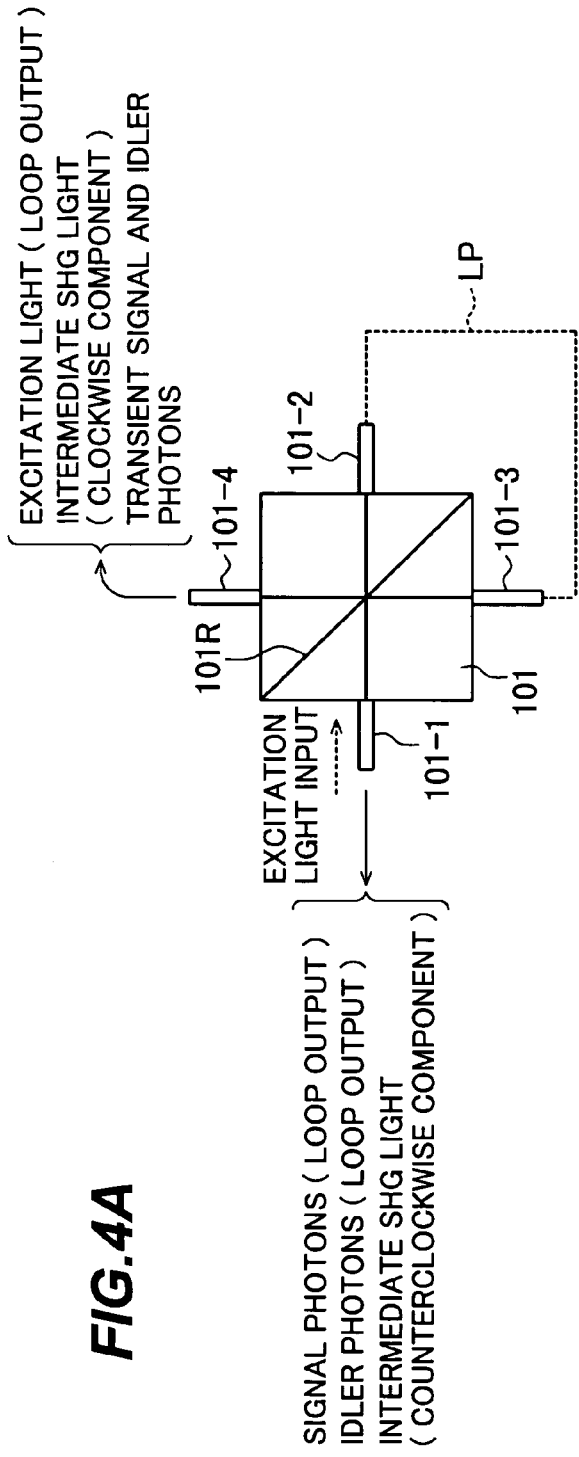
FIG. 4A schematically indicates the input and output ports of excitation light, second harmonic generation (SHG) light, and signal and idler photons in a polarized beam splitter used as the polarization splitting-combining module in FIG. 1.
Figure 4B:
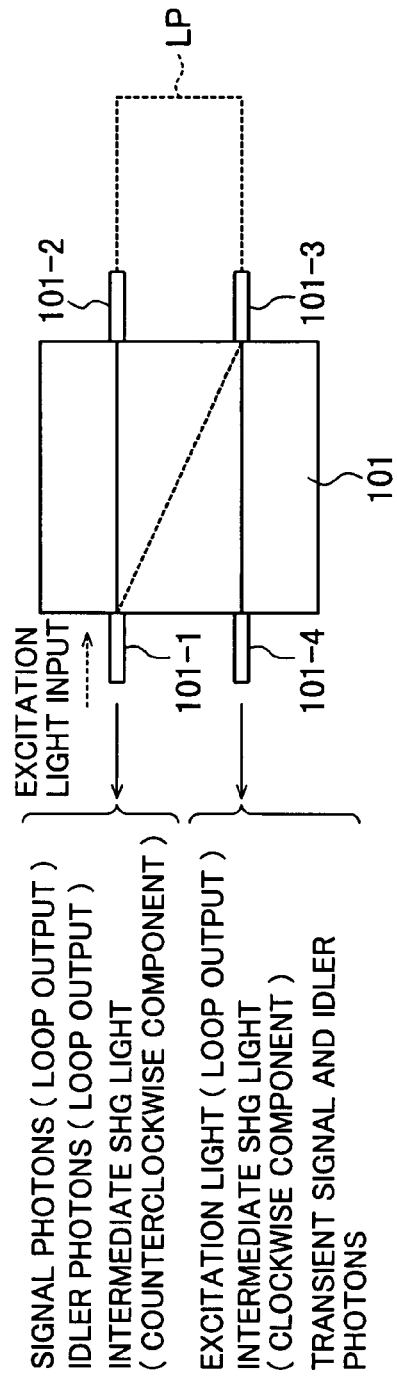
FIG. 4B schematically indicates the input and output ports of excitation light, SHG light, and signal and idler photons in a birefringent prism used as the polarization splitting-combining module in FIG. 1.

The components of the light output from the first input/output port 101-1 of the polarization splitting-combining module 101 are shown in FIGS. 4A and 4B. In FIG. 4A, the polarization splitting-combining module 101 is a polarizing beam splitter using a thin film 101R. In FIG. 4B, the polarization splitting-combining module 101 is a conventional polarizing prism using a birefringent crystal. Either of them may be used in the first embodiment.

As shown in both FIGS. 4A and 4B, the light components output from the first input/output port 101-1 of the polarization splitting-combining module 101 are the desired polarization entangled signal-idler photon pairs and the intermediate SHG light generated by the excitation light propagating counterclockwise in the optical loop. The excitation light returning as loop output, the clockwise component of the intermediate SHG light, and the transient signal and idler photons are in principle output from the fourth input/output port 101-4 of the polarization splitting-combining module 101.

The returning excitation light, which has a relatively strong optical intensity and a wavelength near the wavelength of the entangled photon pairs, is therefore output, together with the unneeded transient light, from a different port from the desired polarization entangled photon pairs The components output from the first input/output port 101-1 are input to the second input/output port 106-2 and output from the third output port 106-3 of the optical circulator 106. For convenience, the wavelength dependency of the optical circulator 106 will be ignored and it will be assumed that the output from the third output port 106-3 includes the intermediate SHG component of wavelength $\lambda_p/2$.

The light output from the third output port 106-3 passes through the optical low-pass filter 107, where the intermediate SHG light component is removed.

The remaining light is input to the WDM filter 108, from which the signal photon component with wavelength $\lambda_s$ and the idler photon component with wavelength $\lambda_i$ are output onto separate optical paths. The signal photon wavelength component and idler photon wavelength component that have passed through the optical circulator 106 are carried on their separate optical transmission paths to respective receiving parties A and B, respectively, who use the photon pairs to communicate as described above.

The (intermediate) SHG light of wavelength $\lambda_p/2$, which serves as seed light in the SPDC process, is needed only within the first and second second-order nonlinear optical media 102, 103, so its transmission losses in optical devices other than the optical conversion generation unit 100 can be ignored, and when the intermediate SHG light leaves the optical loop LP, it can simply be discarded. In particular, the polarization splitting-combining module 101 and the first half-wave plate 104 can be designed for operation at wavelengths near $\lambda_p$, without having to operate in any particular way at the $\lambda_p/2$ wavelength. The optical couplings that couple light into and out of the second-order nonlinear optical media 102, 103 also have to perform well only at or near the $\lambda_p$ wavelength, and not at both wavelengths $\lambda_p/2$ and $\lambda_p$. This can reduce the system cost, as well as reducing optical loss, and produce a higher-purity quantum entangled state.

Since the intermediate SHG light of wavelength $\lambda_p/2$ is not needed outside the second-order nonlinear optical media 102, 103, even a potentially great optical loss of this light in the polarization splitting-combining module 101 and its optical couplings causes no problem. A high optical loss is in fact preferable because it helps reduce the requirements placed on the optical low-pass filter 107 that removes the intermediate SHG component from the final output.

In the first embodiment, in principle, the returning excitation light component and transient signal and idler photon components, which have wavelengths near the wavelength of the desired quantum entangled photon pairs and optical intensities equal to or greater than the optical intensity of the desired quantum entangled photon pairs, are not output from the first input/output port 101-1 of the polarization splitting-combining module 101.

Therefore, since there is in theory no possibility of leakage of high-intensity excitation light into the desired stream of quantum entangled photon pairs at the output port, in principle, the quantum entangled photon pair generating device 10 can operate even if the wavelength of the desired quantum entangled photon pairs is very close or even equal to the wavelength of the input excitation light ($\lambda_s=\lambda_i=\lambda_p$).

This is a great practical advantage, because it means that the full wavelength band of the generated quantum entangled photon pairs can be used effectively. In particular, when the signal and idler photons have identical wavelengths, $\lambda_s=\lambda_i$, wavelength nonidintifiability also occurs, which is preferable for advanced quantum information communication techniques. This property is also useful in the high-efficiency generation of quantum entangled photon pairs by use of second-order nonlinear optical media structured so as to narrow the wavelength band of the quantum entangled photon pairs, thereby generating quantum entangled photons with high efficiency per unit wavelength.

As the first and second second-order nonlinear optical media 102, 103, a bulk lithium niobate (LiNbO$_3$) crystal or bulk PPLN crystal, a PPLN waveguide formed in such a bulk crystal, or other various second-order nonlinear optical media may be used, depending on the desired wavelengths of the quantum entangled photon pairs. For example, the LiNbO$_3$ crystal described by Lim et al. may be used to produce quantum entangled photon pairs in the 1.5-micrometer waveband.

In order to realize the quantum entangled photon pair generating device 10 in the first embodiment, it is of particular significance for industrial use for the SHG and SPDC processes to take place within the first and second second-order nonlinear optical media 102, 103 with high efficiency. For this reason, the phase matching between the input excitation light and the SHG light and between the SHG light and the signal and idler light are both important.

For a bulk crystal, angle phase matching is commonly used, but as pointed out by Takeuchi, the resulting spatial separation of the signal and idler photons can lower the purity of the quantum entangled state.

Use of a ferroelectric periodic-polarization inverting structure, or other structure in which the second-order nonlinear optical coefficients are spatially modulated has the advantage of producing a quasi-phase matching condition without relying on angle phase matching.

A second-order nonlinear optical medium combined with an optical waveguide structure has the advantage of mitigating the loss of purity of the quantum entanglement state due to spatial separation, and also the advantage of strong light confinement, which increases the second-order nonlinear optical coefficients, thereby increasing the probabilities with which the SHG and SPDC processes take place. For the 1.5-micrometer waveband, a PPLN waveguide is therefore thought to be an optimal second-order nonlinear optical medium for use in the optical conversion generation unit 100.

The energy conservation law and momentum conservation (phase matching) laws for the SHG and SPDC processes in a PPLN waveguide can be expressed by the following equations (2) to (5). The relationship between wavenumber and wavelength in a PPLN waveguide with an effective refractive index n is given by equation (6).

SHG Process:

$$\text{energy conservation law} \quad \frac{1}{\lambda_{SHG}} = \frac{2}{\lambda_p} \qquad (2)$$

$$\text{momentum conservation law} \quad 2k_p - k_{SHG} = \frac{2\pi}{\Lambda} \qquad (3)$$

SPDC Process:

$$\text{energy conservation law} \quad \frac{1}{\lambda_{SHG}} = \frac{2}{\lambda_p} = \frac{1}{\lambda_s} + \frac{1}{\lambda_i} \quad (4)$$

$$\text{momentum conservation law} \quad k_s + k_i - k_{SHG} = \frac{2\pi}{\Lambda} \quad (5)$$

$$k_x = \frac{2\pi n_x}{\lambda_x} \quad (x = p, SHG, s, i) \quad (6)$$

In these equations, λ indicates vacuum wavelength, k indicates wavenumber in the PPLN waveguide, Λ indicates the PPLN polarization reversal period, and the subscripts p, SHG, s, and i represent the input excitation light, SHG light, signal photons, and idler photons, respectively.

Equations (2) and (4) represent wavelengths and frequency relationships based on the law of conservation of energy. The wavelength of the SHG light is half the wavelength of the input excitation light. The sum of the optical frequencies of the signal and idler photons is equal to the frequency of the SHG seed light from which they are generated and is therefore twice the frequency of the input excitation light, where light of a wavelength λ has a frequency of c/λ, c being the speed of light in a vacuum.

Equations (3) and (5) relate to phase matching. If the effective refractive indices $n_p$, $n_{SHG}$ are determined from the excitation light wavelength $\lambda_p$ and the shape of the PPLN waveguide, the polarization reversal period Λ is determined from equations (3) and (6).

If the signal and idler photon wavelengths differ from each other ($\lambda_s \neq \lambda_p$, $\lambda_i \neq \lambda_p$), in general, equations (3) and (5) do not both hold. That is, the phase matching conditions for the SHG and SPDC processes are incompatible.

From the well-known solution of the coupled-mode equation describing the nonlinear optical effect, however, phase unmatch is expected to decrease the probability of occurrence of the SHG and SPDC processes in proportion to $\{\sin^2(\delta L/2)\}/(\delta L/2)^2$, where δ is defined by equation (7) and indicates the phase unmatch in the SPDC process, and L indicates the PPLN waveguide length.

$$\delta = k_s + k_i - k_{SHG} - \frac{2\pi}{\Lambda} \quad (7)$$

If the phase unmatch tolerance limit is assumed to be a 50% decrease in the probability of occurrence of the SHG and SPDC processes from the maximum value obtained under phase matching conditions, the value of δ is approximately 2.78, as derived from the following equation:

$$\frac{\sin^2(\delta L/2)}{(\delta L/2)^2} = 0.5$$

This limits the wavelength band of the correlated photon pairs generated in the SPDC process, and determines the wavelength range of the correlated signal and idler photons.

In a vicinity of the excitation light wavelength in which the wavelength dependency of the effective refractive index is substantially linear and can be represented by equation (8), equation (9) is obtained from equations (4), (6), and (8), so the phase matching condition equations (3) and (5) can both be satisfied within this wavelength range.

$$n(\lambda) = A + B\lambda \quad (8)$$

$$2k_p = \frac{4\pi n_p}{\lambda_p} \quad (9)$$
$$= 2\pi \frac{2}{\lambda_p}(A + B\lambda_p)$$
$$= 2\pi\left[\left(\frac{1}{\lambda_s} + \frac{1}{\lambda_i}\right)A + 2B\right]$$
$$= 2\pi\left[\frac{A + B\lambda_s}{\lambda_s} + \frac{A + B\lambda_i}{\lambda_i}\right]$$
$$= 2\pi\left[\frac{n_s}{\lambda_s} + \frac{n_i}{\lambda_i}\right]$$
$$= k_s + k_i$$

From the above description, it will be understood that in order to realize the optical conversion generation unit 100 in the first embodiment, first the polarization reversal period Λ of the PPLN waveguide should be chosen to satisfy equation (3). Generation of correlated signal and idler photons with a wavelength combination ($\lambda_s$, $\lambda_i$) satisfying the SPDC phase matching condition represented by equation (5), or at least having a phase unmatch within an allowed tolerance range, can then can be expected, leading to output of the desired quantum entangled photon pairs.

The following effects can be expected from the first embodiment. Unlike the prior art, this invention allows the first and second second-order nonlinear optical media 102, 103 disposed in the optical loop to carry out the SPDC process and also to generate the seed light needed for the SPDC process, so that light of the seed wavelength does not have to be supplied from outside the optical loop. Since the SHG light is needed only in the second-order nonlinear optical media 102, 103, the other system components need not couple or propagate the SHG light with low loss. Therefore, the quantum entangled photon pair generating device and other system components such as coupling lenses do not have to be designed for operation at wavelengths of both $\lambda_p$ and $\lambda_p/2$; they can be optimized for operation at and near $\lambda_p$. The result is that the system fabrication cost is reduced, less optical loss occurs at the wavelengths of the excitation light and the output photon pairs, and a quantum entangled optical pair generating device is obtained that can produce a quantum entangled state of improved purity.

Three variations of the first embodiment will be described with reference to FIGS. 5, 6, 7A, and 7B. In the first two of these variations, the method of input and output of the excitation light and quantum entangled photon pairs is altered.

Figure 5:
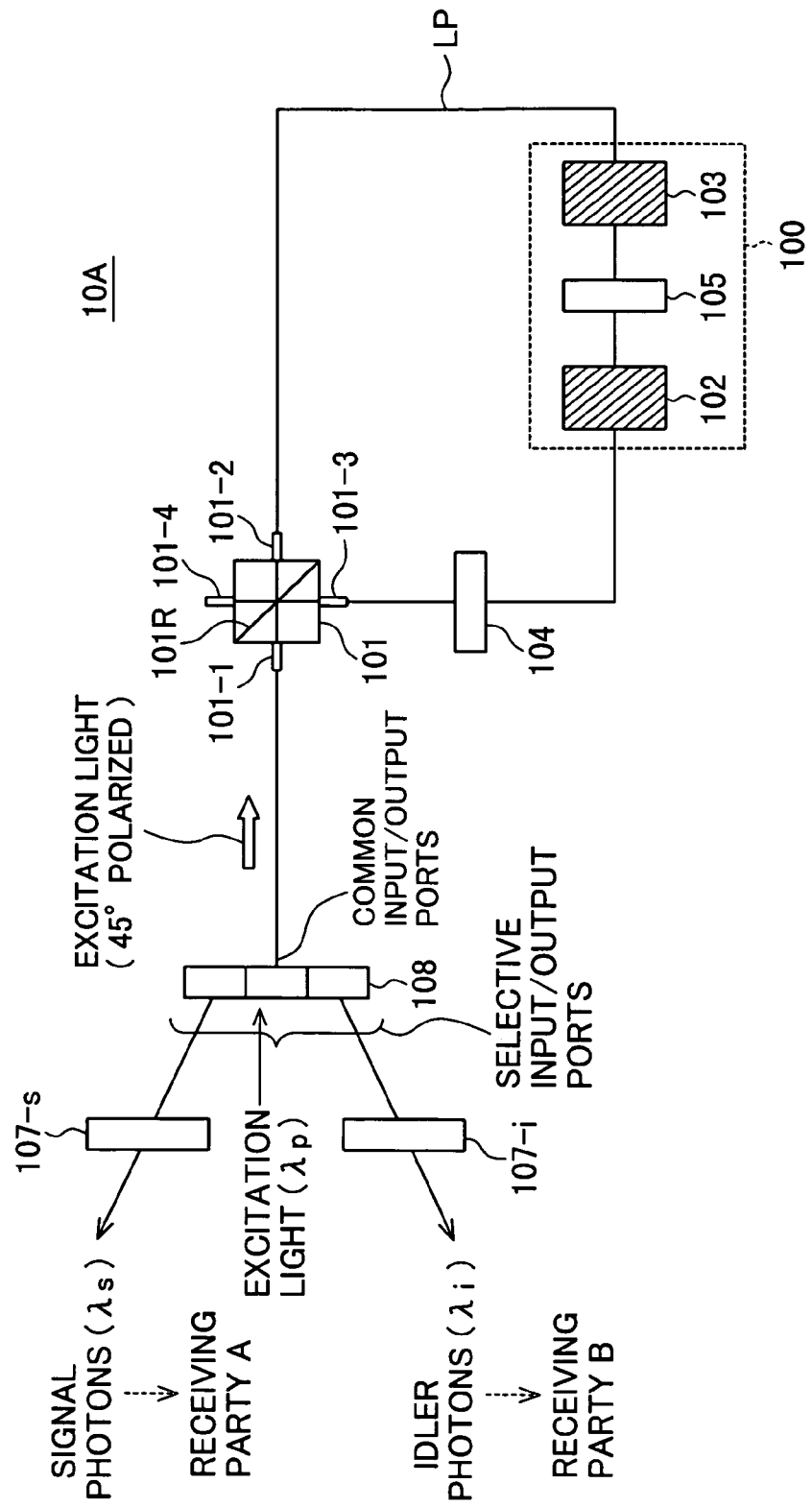
FIG. 5 schematically illustrates the structure of a polarization entangled photon pair generating device in a variation of the first embodiment.

The variation shown in FIG. 5 dispenses with the optical circulator. The quantum entangled photon pair generating device 10A in FIG. 5 uses an arrayed waveguide grating (AWG) as the WDM filter 108. The AWG 108 has at least three transmission wavelengths: the signal photon wavelength $\lambda_s$, the idler photon wavelength $\lambda_i$, and the excitation wavelength $\lambda_p$.

The AWG 108 has wavelength selective input/output ports that transmit light of different wavelengths and a common input/output port that transmits light of all the input/output wavelengths. Light input to the common input/output port is separated into individual wavelength components and output from the corresponding wavelength selective ports.

Excitation light from an external source is input to a wavelength selective port that transmits at the excitation wavelength, is then output from the common port to the first input/output port 101-1 of the polarization splitting-combining module 101, and is input bidirectionally (clockwise and counterclockwise) to the second-order nonlinear optical media 102, 103 as in the first embodiment.

The light returning from the optical loop LP through the first input/output port 101-1 of the polarization splitting-combining module 101 to the common port of the AWG 108 is separated into a signal photon component and an idler photon component, which are output through the wavelength selective ports for the corresponding wavelengths. If necessary, optical low-pass filters 107-s, 107-i may be inserted downstream of the signal and idler output ports, as shown, to remove the SHG wavelength component.

Figure 6:
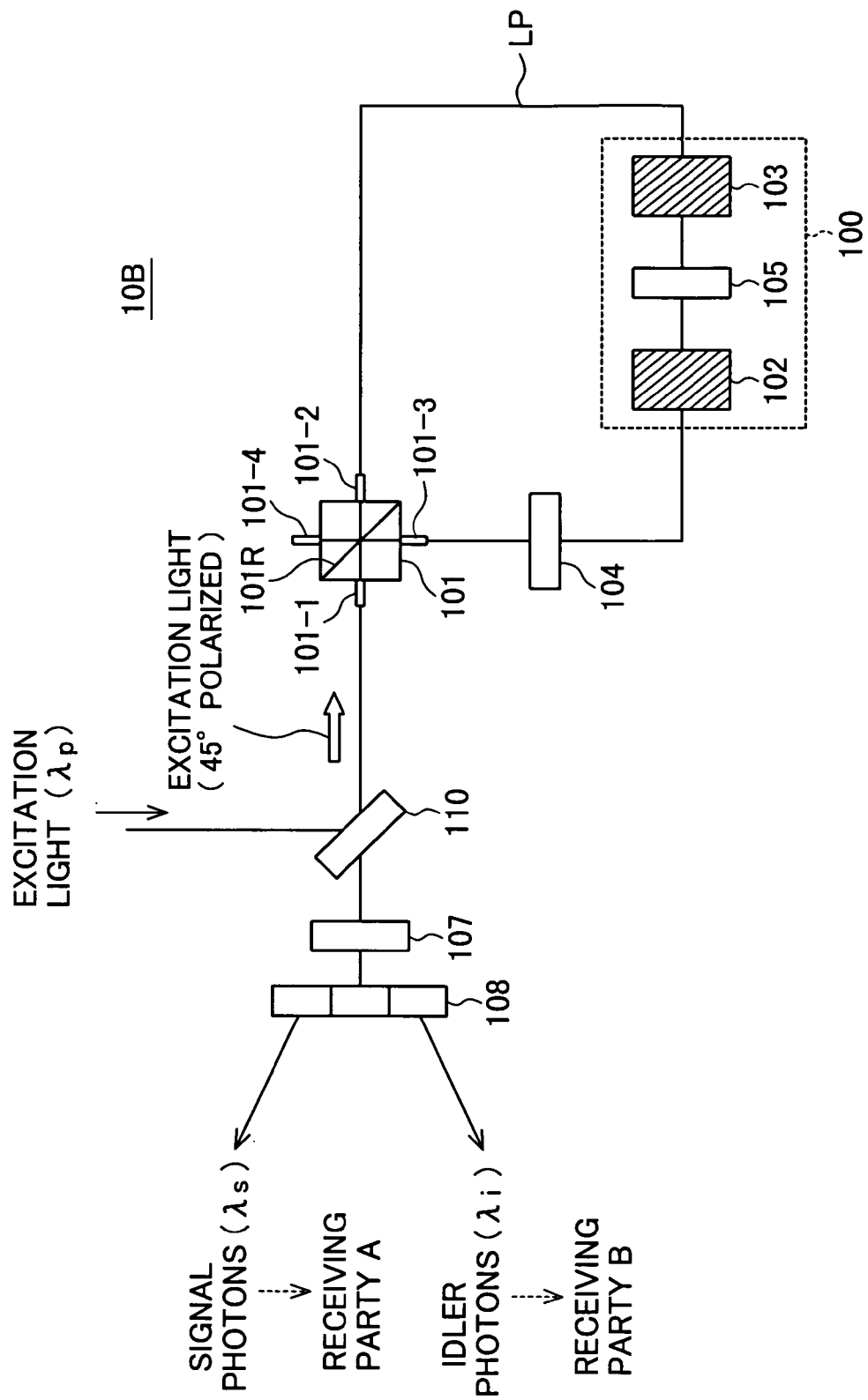
FIG. 6 schematically illustrates the structure of a polarization entangled photon pair generating device in another variation of the first embodiment.

FIG. 6 shows another variation of the first embodiment in which the optical circulator is not used.

The quantum entangled photon pair generating device 10B in FIG. 6 uses a narrowly selective optical bandpass filter 110 that selectively reflects light with a wavelength of $\lambda_p$ and transmits light of other wavelengths, including the signal and idler wavelengths. Alternatively, an optical bandpass filter 110 that transmits light with a wavelength of $\lambda_p$ and reflects light of other wavelengths may be used. The signal and idler wavelengths must be sufficiently separated from the excitation wavelength $\lambda_p$ so as not to overlap the reflection or transmission band of the optical bandpass filter 110.

The optical bandpass filter 110 in FIG. 7 reflects excitation light of wavelength $\lambda_p$ into the first input/output port 101-1 of the polarization splitting-combining module 101. Among the light components that traverse the optical loop LP, return to the polarization splitting-combining module 101, and are output from the first input/output port 101-1, any residual excitation light component that may be present is again reflected by the optical bandpass filter 110, and the other components are transmitted through the optical bandpass filter 110 to an optical low-pass filter 107, which removes the SHG component. The signal photon component and idler photon component are then separated by a WDM filter 108 and output on separate optical paths.

The optical conversion generation unit 100 in FIG. 1 includes three discrete devices: the two second-order nonlinear optical media 102, 103 and the second half-wave plate 105. FIGS. 7A and 7B show an alternative optical conversion generation unit 100C in which these three components are integrated into a single crystal substrate. This structure is substantially the same as the structure of the integrated polarization independent quasi-phase-matched frequency generation (QPM-DFG) wavelength converter shown in FIG. 7 on page 300 in *Bunkyokuhantendebaisu no kiso to oyo* (*Foundations and Applications of Polarization Inverting Devices*) by Shintaro Miyazawa and Tadashi Kurimura, first published by Optronics Co. on Jun. 8, 2005.

To fabricate the optical conversion generation unit 100C in FIG. 7, first, a polarization inversion structure (indicated by arrows in the side view in FIG. 7B) and a PPLN waveguide structure (indicated the central stripe 190 in the top plan view FIG. 7A) are formed together in a single LiNbO$_3$ substrate. The second half-wave plate 105 is then embedded in the LiNbO$_3$ substrate, cutting laterally across the PPLN waveguide at its center, separating the PPLN waveguide into two parts that function as a first second-order nonlinear optical medium 102C and a second second-order nonlinear optical medium 103C, corresponding to the first and second second-order nonlinear optical media 102, 103 in FIG. 1.

A Zn-diffused waveguide that guides both TE (transverse electric) and TM (transverse magnetic) waves may be used in this structure, but use of a type of waveguide, such as a proton exchange waveguide channel, that guides only one of the two types of waves (e.g., the TM wave for a proton exchange waveguide channel) and does not guide the orthogonally polarized (e.g., TE) wave is more effective because it produces a higher optical insertion loss.

The reason is that since the p-polarization direction in this variation matches, for example, the TM polarization direction, the input excitation light and the transient signal and idler photons output from the first-stage second-order nonlinear optical medium suffer a high propagation loss in passing as TE waves through the second-stage second-order nonlinear optical medium. This leaves less residual excitation and transient light to contaminate the output of desired quantum entangled photon pairs at the first input/output port 101-1 of the polarization splitting-combining module 101, which generally has a finite polarization extinction ratio and does not eliminate such contamination completely.

In the above description, it is assumed that the input excitation light, the intermediate SHG light generated from the input excitation light, and the correlated photon pairs generated from the intermediate SHG light are all polarized in the same direction, but this is not a necessary condition. If the $d_{31}$ component of the PPLN second-order nonlinear optical coefficient matrix is used for the SHG and SPDC processes, for example, the same effect as in the first embodiment can be obtained by inserting the first half-wave plate 104 between the optical conversion generation unit 100 and the second input/output port 101-2 of the polarization splitting-combining module 101.

Second Embodiment

The second embodiment dispenses with the optical circulator used in the first embodiment and uses a more complex polarization manipulation unit in the optical loop.

Referring to FIG. 8, the quantum entangled photon pair generating device 10C in the second embodiment replaces the first half-wave plate used in the first embodiment with two pairs of nonreciprocal polarization converters 211, 212, each consisting of a Faraday rotator and a half-wave plate. This structure guarantees that the fundamental operations described in the first embodiment can be carried out, and enables the desired quantum entangled photon pairs to be output from a different port of the polarization splitting-combining module 101 than the port at which the excitation light is input.

The first nonreciprocal polarization converter 211 includes a first Faraday rotator 207 and a third half-wave plate 208 inserted in cascade on the optical loop LP between the third input/output port 101-3 of the polarization splitting-combining module 101 and the optical conversion generation unit 100. The second nonreciprocal polarization converter 212 includes a second Faraday rotator 209 and a fourth half-wave plate 210 inserted in cascade between the second input/output port 101-2 of the polarization splitting-combining module 101 and the optical conversion generation unit 100.

The Faraday rotators 207, 209 each rotate the plane of polarization of incident light by exactly 45° at the excitation wavelength of $\lambda_p$ and by approximately 90° at the SHG wavelength of $\lambda_p/2$. The half-wave plates 208, 210, like the half-wave plate in the first embodiment, have fast and slow axes that produce an optical phase difference of $\pi$ radians at the $\lambda_p$ wavelength of the excitation light.

The components in the nonreciprocal polarization converters 211, 212 are aligned as shown in FIG. 9. The first nonreciprocal polarization converter 211 and second nonreciprocal polarization converter 212 have the same structure, so FIG. 9 applies to both, although only reference numerals for the first nonreciprocal polarization converter 211 are shown Excitation light linearly polarized in a specific direction may be input from the side of the first Faraday rotator 207 or from the side of the third half-wave plate 208. The specific polarization direction matches either the p-polarization direction or the s-polarization direction in the polarization splitting-combining module 101. The optical axes of the third half-wave plate 208 are oriented at 22.5° angles to the p- and s-polarization directions.

The polarization splitting-combining module 101, first and second second-order nonlinear optical media 102, 103, second half-wave plane 105, optical low-pass filter 107, and WDM filter 108 in FIG. 8 function as in the first embodiment, so descriptions will be omitted.

Next, the operation of the quantum entangled photon pair generating device 10C with the above structure will be described.

As in the first embodiment, when 45° excitation light of wavelength $\lambda_p$ is input to the first input/output port 101-1 of the polarization splitting-combining module 101, it is separated into a p-polarized component output from the second input/output port 101-2 and an s-polarized component output from the third input/output port 101-3, each component having the same optical intensity.

First, the processes that take place as the s-polarized component of the excitation light output from the third input/output port 101-3 of the polarization splitting-combining module 101 propagates in the counterclockwise direction on the optical loop LP will be described.

This component of the excitation light initially encounters the first nonreciprocal polarization converter 211. The variations in its polarization state in this polarization converter 211 will be described with reference to FIG. 9 and FIGS. 9A to 9D.

The s-polarized component output from the third input/output port 101-3 is indicated by a rightward-pointing arrow in FIG. 9A. In passing through the first Faraday rotator 207, the polarization of this component is rotated by 45° counterclockwise, as indicated by a 45° upper-right pointing arrow in the center in FIG. 9A. The light then passes through the third half-wave plate 208, the optical axes of which are oriented at angles of 22.5° to the p- and s-polarization directions. The axis near the p-polarization direction is also at an angle of 22.5° to the plane of polarization of the light that has passed through the Faraday rotator 207, so the polarization of this light is rotated by a further 45° and the light output from the third half-wave plate 208 is p-polarized, as indicated by the upward-pointing arrow at the far right in FIG. 9A.

In short, the first nonreciprocal polarization converter 211 rotates the polarization of the s-polarized incident light of wavelength $\lambda_p$ counterclockwise by 90°.

The originally s-polarized but now p-polarized excitation light output from the first nonreciprocal polarization converter 211 is input to the first second-order nonlinear optical medium 102. As explained in the first embodiment, s-polarized excitation light, s-polarized transient light, p-polarized intermediate SHG light, and the desired p-polarized SPDC correlated photon pairs are output from the second second-order nonlinear optical medium 103 in the optical conversion generation unit 100.

The now s-polarized excitation component and transient component, the p-polarized intermediate SHG light, and the p-polarized desired SPDC correlated photon pairs generated in the second second-order nonlinear optical medium 103 are input to the second nonreciprocal polarization converter 212. The axes of the fourth half-wave plate 210 of the second nonreciprocal polarization converter 212 are also oriented at angles of 22.5° to the p- and s-polarization directions. Operating in the same way as the first nonreciprocal polarization converter 211, the second nonreciprocal polarization converter 212 rotates the polarization plane of the excitation light component and the transient light component, which have wavelengths equal or near to $\lambda_p$, counterclockwise by 90°. The excitation light and the transient component are thereby converted back to p-polarized light. A similar counterclockwise 90° polarization rotation is effected on the desired SPDC correlated photon pairs, which exit the second nonreciprocal polarization converter 212 in the s-polarized state.

The excitation light, the transient component, and the desired SPDC correlated photon pairs propagating on the optical loop LP in the counterclockwise direction now enter the second input/output port 101-2 of the polarization splitting-combining module 101. The s-polarized desired SPDC correlated photon pairs are output from the fourth input/output port 101-4 of the polarization splitting-combining module 101. This contrasts with the first embodiment, in which the excitation light and the desired SPDC correlated photon pair were output from the first input/output port 101-1. The p-polarized excitation light and transient signal-idler photon pairs are output from the first input/output port 101-1 of the optical conversion generation unit 100, to which the original excitation light is input.

The p-polarized component of the excitation light output from the second input/output port 101-2 of the polarization splitting-combining module 101 propagates on the optical loop LP in the clockwise direction, passing through the second nonreciprocal polarization converter 212, the optical conversion generation unit 100, and the first nonreciprocal polarization converter 211. The variations in the polarization state in the second nonreciprocal polarization converter 212 can also be described with reference to FIG. 9 by substituting reference characters 209 and 210 for reference characters 207 and 208.

In FIG. 9B, the p-polarized component indicated by the far right upward-pointing arrow is input to the fourth half-wave plate 210 and its polarization plane is rotated by 45° in the clockwise direction, as indicated by the 45° upper-right pointing arrow in the center of FIG. 9B, due to the 22.5° angle between its polarization plane and the corresponding optical axis of the fourth half-wave plate 210. The rotated output light then passes through the second Faraday rotator 209, in which its polarization is rotated by 45° in the counterclockwise direction. Accordingly, the originally p-polarized component is output from the second nonreciprocal polarization converter 212 without change as p-polarized light.

Similarly, no rotation of polarization of p- or s-polarized light with a wavelength of or near $\lambda_p$ occurs in clockwise passage through the first nonreciprocal polarization converter 211, because of the 22.5° angles between the axes of the half-wave plate and the p- and s-polarization directions.

The p-polarized excitation light output from the second nonreciprocal polarization converter 212 is input to the second second-order nonlinear optical medium 103. As in the first embodiment, s-polarized excitation light, s-polarized transient signal and idler photons, p-polarized intermediate SHG light, and desired p-polarized SPDC correlated photon pairs are output from the first second-order nonlinear optical medium 102 and enter the first nonreciprocal polarization converter 211.

The s-polarized excitation light and transient components and the p-polarized SPDC correlated photon pairs pass through the first nonreciprocal polarization converter 211 with their polarization states unchanged and enter the third input/output port 101-3. The p-polarized SPDC correlated photon pairs are output as polarization entangled photon pairs from the fourth input/output port 101-4, instead of the first input/output port 101-1 to which the original excitation light was input. The s-polarized returning excitation light and the s-polarized transient signal and idler photons are output are output from the first input/output port 101-1.

Next the variations in the polarization of the intermediate SHG light output from the second-order nonlinear optical medium 102 when passing through the first nonreciprocal polarization converter 211 and the second nonreciprocal polarization converter 212 will be described. At the wavelength ($\lambda_p/2$) of the SHG light, the third half-wave plate 208 in the first nonreciprocal polarization converter 211 and the fourth half-wave plate 210 in the second nonreciprocal polarization converter 212 are single-wave plates, which cause no rotation of polarization, but a substantially 90° rotation is produced by passage through each of the Faraday rotators 207, 209. The intermediate SHG light therefore emerges from the first nonreciprocal polarization converter 211 and second nonreciprocal polarization converter 212 with its plane of polarization rotated by substantially 90°, regardless of its input direction, as shown in FIGS. 9C and 9D.

Consequently, the intermediate SHG light traveling clockwise leaves the optical conversion generation unit 100 with p-polarization, is converted to s-polarized light by the first nonreciprocal polarization converter 211, enters the third input/output port 101-3 of the polarization splitting-combining module 101, and (ignoring the wavelength dependence of the polarization splitting-combining module 101) exits from the first input/output port 101-1. The intermediate SHG light traveling counterclockwise leaves the optical conversion generation unit 100 with p-polarization, is converted to s-polarized light by the second nonreciprocal polarization converter 212, enters the second input/output port 101-2 of the polarization splitting-combining module 101, and (again ignoring the wavelength dependence of the polarization splitting-combining module 101) exits from the fourth input/output port 101-4.

Figure 10:
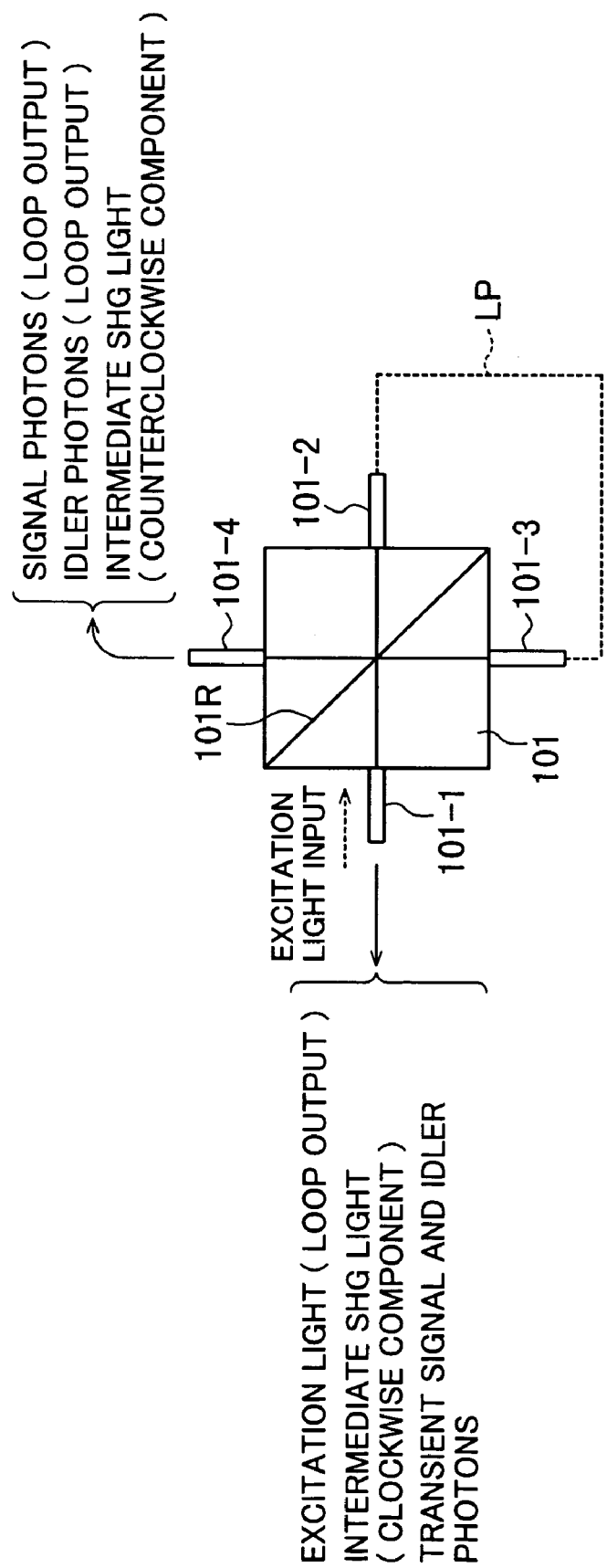
FIG. 10 schematically indicates the input and output ports for excitation light, SHG light, and signal and idler photons in the second embodiment.

The above discussion is summarized in FIG. 10. The desired quantum entangled photon pairs are output from the fourth input/output port 101-4 of the polarization splitting-combining module 101 together with the counterclockwise intermediate SHG light component. The returning excitation light, the transient signal and idler photons, and the clockwise intermediate SHG light component are output from the first input/output port 101-1.

The output from the fourth input/output port 101-4 is processed as was the output from the first input/output port 101-1 in the first embodiment. The intermediate SHG light and any residual excitation light that may be mixed with the SPDC correlated photon pairs are removed by the optical low-pass filter 107 and WDM filter 108, and the SPDC correlated photon pairs are separated into signal photons and idler photons and output onto separate optical paths.

The effect of the second embodiment is that no optical circulator is needed to separate the output path of the desired quantum entangled photon pairs from the input path of the excitation light. The purity of the desired output is thereby improved, because leakage of excitation light into the output path through the circulator is eliminated. If necessary, however, an optical circulator may be provided on the excitation light input path, as in the first embodiment, to prevent returning excitation light from destabilizing the operation of the excitation light source (not shown).

Third Embodiment

Figure 11:
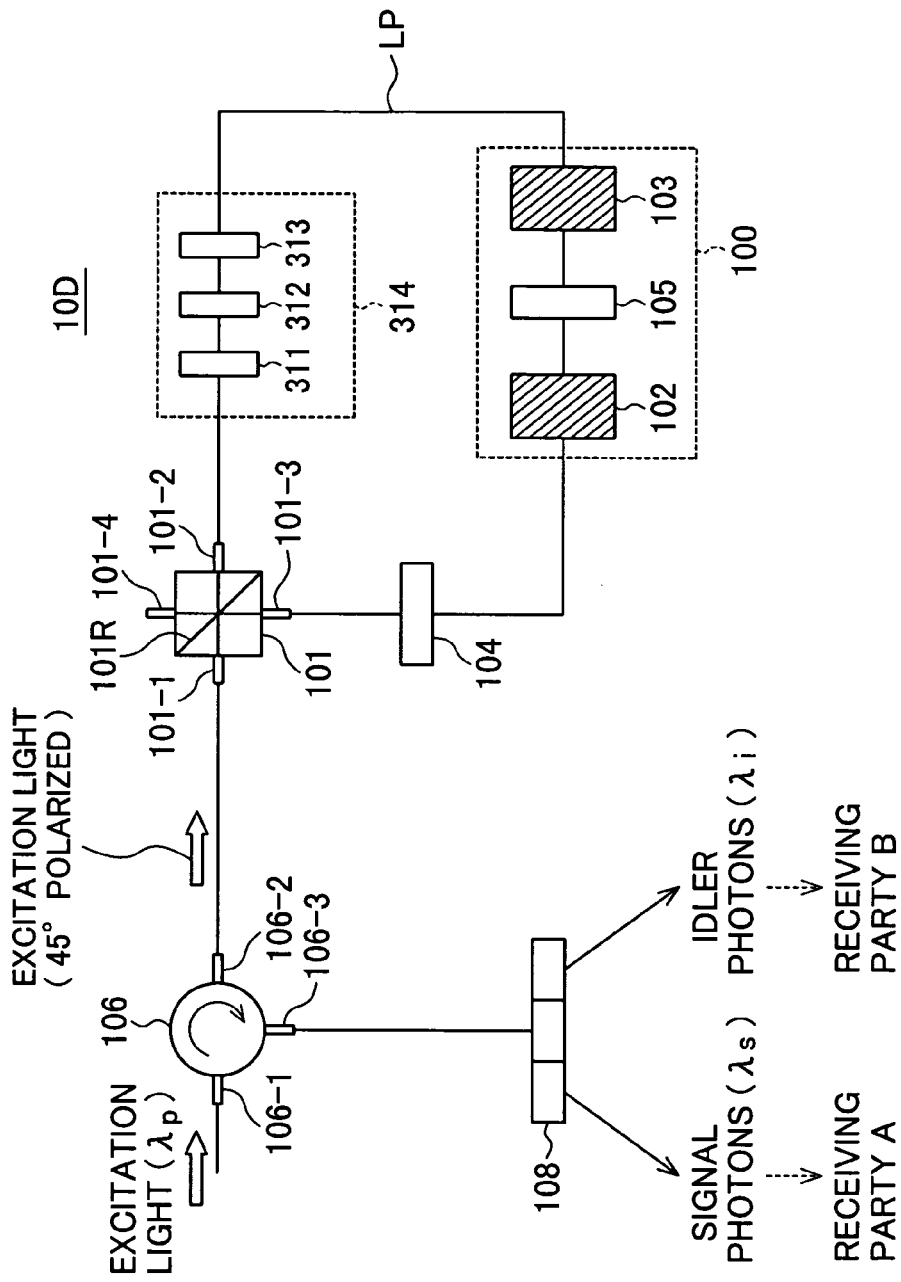
FIG. 11 schematically illustrates the structure of a polarization entangled photon pair generating device in a third embodiment of the invention.

Referring to FIG. 11, the quantum entangled photon pair generating device 10D in the third embodiment is generally similar in structure to the quantum entangled photon pair generating device in the first embodiment, but lacks the optical low-pass filter of the first embodiment and instead includes a polarization converter 314 between the second input/output port 101-2 of the polarization splitting-combining module 101 and the optical conversion generation unit 100. The polarization converter 314 includes a fifth half-wave plate 311, a quarter-wave plate 312, and a sixth half-wave plate 313 coupled in cascade.

Figure 12:
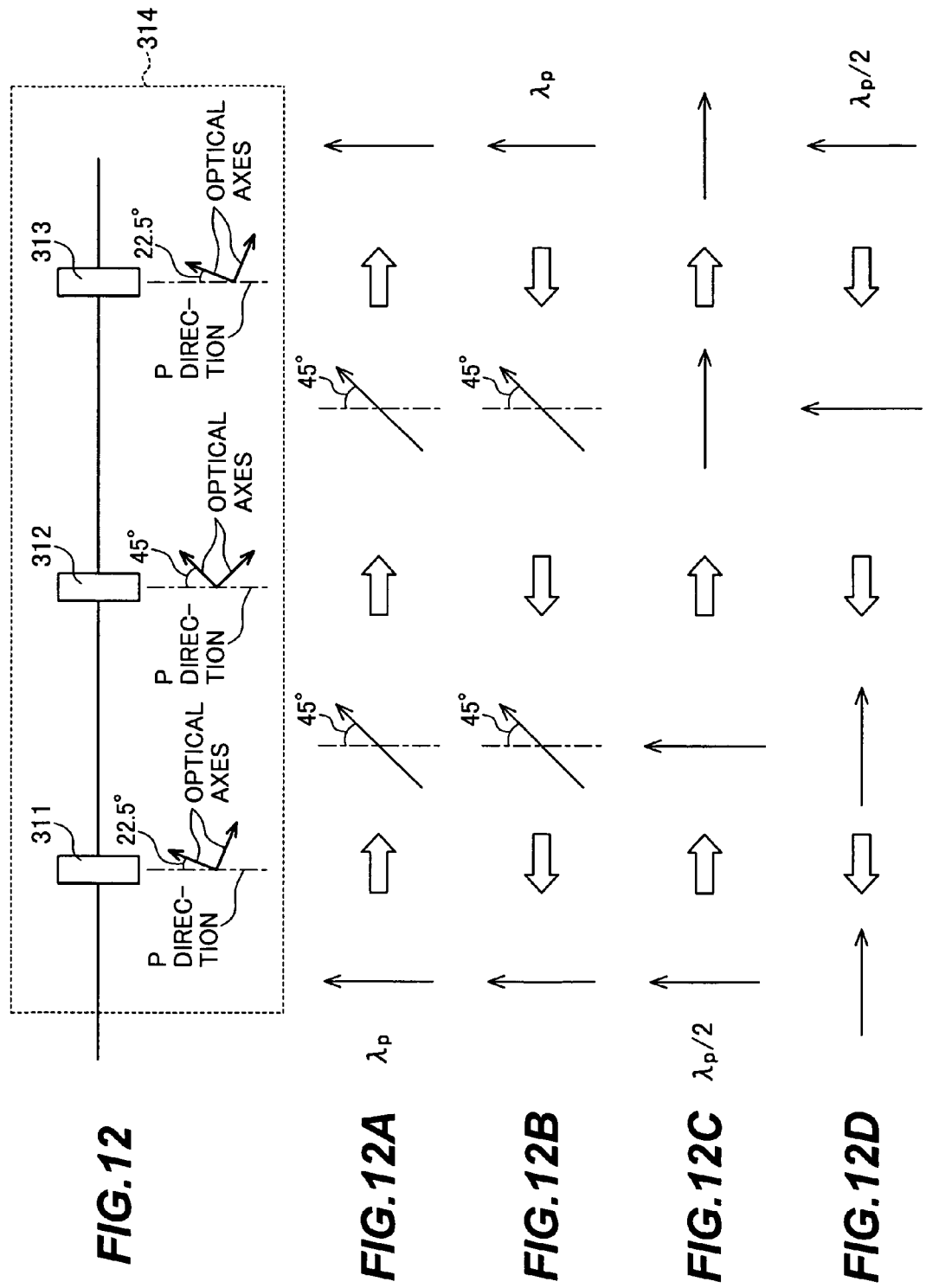

The optical axes of the fifth half-wave plate 311, quarter-wave plate 312, and sixth half-wave plate 313 are aligned as shown in FIG. 12. The optical axes of the fifth half-wave plate 311 and the sixth half-wave plate 313 are rotated clockwise by angles of 22.5° from the and s-polarization directions (the p-polarization direction is shown in FIG. 12). The optical axes of the quarter-wave plate 312 make 45° angles to the p- and s-polarization directions.

The optical conversion generation unit 100, polarization splitting-combining module 101, first half-wave plate 104, optical circulator 106, and WDM filter 108 function as in the first embodiment, so descriptions will be omitted.

The operation of the quantum entangled photon pair generating device 10D will now be described.

As in the first embodiment, when excitation light of wavelength $\lambda_p$ is input to the first input/output port 101-1 of the polarization splitting-combining module 101, linearly polarized at a 45° angle to the p- and s-directions of the polarization splitting-combining module 101, it is separated into a p-polarized component output from the second input/output port 101-2 and an s-polarized component output from the third input/output port 101-3, each component having the same optical intensity.

A distinctive effect in the third embodiment, which will be described later, is produced by the wavelength dependency of the polarization converter 314. This will now be described with reference to FIG. 12 and FIGS. 12A to 12D.

FIG. 12A shows the variations in the polarization state of the p-polarized component of the excitation light output from the second input/output port 101-2 in passing through the polarization converter 314.

From the second input/output port 101-2, the p-polarized component of the excitation light with wavelength $\lambda_p$, indicated by an upward-pointing arrow at the far left in FIG. 12A, first passes through the fifth half-wave plate 311. Because of the orientation of the optical axes of the fifth half-wave plate 311, this excitation light component leaves the fifth half-wave plate 311 with its polarization plane rotated 45° clockwise from the p-polarization direction, as indicated by the first upper-right pointing arrow in FIG. 12A.

Next this excitation light component, now polarized at an angle of 45° with respect to the p- and s-directions, enters the quarter-wave plate 312. The optical axes of the quarter-wave plate 312 are also oriented at 45° angles to the p- and s-polarization directions, so no polarization rotation occurs as the light passes through the quarter-wave plate 312.

After passing through the quarter-wave plate 312, this excitation light component, still polarized at a 45° angle clockwise from the p-polarization direction, enters the sixth half-wave plate 313. Because of the 22.5° clockwise angle of the optical axes of the sixth half-wave plate 313, the polarization plane of the excitation light is rotated by 45° in the counterclockwise direction and returns to the p-polarization direction, as indicated by the upward-pointing arrow at the far right in FIG. 12A.

The p-polarized component of the excitation light is therefore output from the polarization converter 314 with its original polarization unchanged. Because of the symmetrical structure of the polarization converter 314, the same also holds in the passage of p-polarized light in the opposite direction, as indicated by FIG. 12B.

Next, the variations in the polarization of the intermediate SHG light with wavelength $\lambda_p/2$ as it passes through the polarization converter 314 will be described with reference to FIGS. 12C and 12D. FIG. 12C shows the variations in the polarization state of hypothetical intermediate SHG light propagating clockwise around the optical loop LP. FIG. 12D shows the variations in the polarization state of the intermediate SHG light propagating counterclockwise.

At the $\lambda_p/2$ wavelength of the intermediate SHG light, the half-wave plates 311 and 313 act as single-wave plates, and the quarter-wave plate 312 acts as a half-wave plate. Accordingly, the p-polarized SHG light propagating counterclockwise passes through the sixth half-wave plate 313 with its polarization unchanged, as indicated by the upward-pointing arrows to the right of center in FIG. 12D, has its polarization plane rotated by 90° by the quarter-wave plate 312, as indicated by the rightward-pointing arrow to the left of center in FIG. 12D, and passes through the fifth half-wave plate 311 with its polarization unchanged, as indicated by the rightward-pointing arrow at the far left in FIG. 12D.

Therefore, the polarization converter 314 rotates the polarization plane of the intermediate SHG light propagating in the counterclockwise direction around the optical loop LP by 90°, so that the intermediate SHG light is s-polarized when it leaves the polarization converter 314. Similarly, intermediate SHG light propagating clockwise would be changed from p-polarization to s-polarization, as shown in FIG. 12C, if it passed through the polarization converter 314.

To summarize, in passage through the polarization converter 314, the polarization of the excitation light, the desired SPDC correlated photon pairs, and the transient photon pairs, all of which have wavelengths equal or near to $\lambda_p$, is not rotated, while the polarization plane of the SHG light, which has a wavelength of $\lambda_p/2$, is rotated by 90°. The 22.5° and 45° angles of the optical axes of the optical elements in the polarization converter 314 are selected for the purpose of accomplishing this polarization conversion.

The overall operation of the third embodiment will now be described. The wavelength dependency of the polarization splitting-combining module 101, which affects only the SHG light, will continue to be ignored.

Since the polarization converter 314 does not change the polarization of the excitation light, the transient light, and the desired signal and idler photon pairs, these components are output from the optical loop LP as in the first embodiment: the desired signal and idler photon pairs from the first input/output port 101-1 of the polarization splitting-combining module 101; the returning excitation light and the transient light from the fourth input/output port 101-4, which is not used.

Since the clockwise-propagating intermediate SHG light generated in the optical conversion generation unit 100 does not pass through the polarization converter 314, the clockwise-propagating intermediate SHG light is also output from the optical loop LP as in the first embodiment, from the fourth input/output port 101-4 of the polarization splitting-combining module 101.

The counterclockwise-propagating intermediate SHG light generated in the optical conversion generation unit 100 passes through the polarization converter 314 and is changed from the p-polarization state to the s-polarization state as shown in FIG. 9D. The s-polarized intermediate SHG light then enters the second input/output port 101-2 of the polarization splitting-combining module 101 and exits from the fourth input/output port 101-4.

Figure 13:
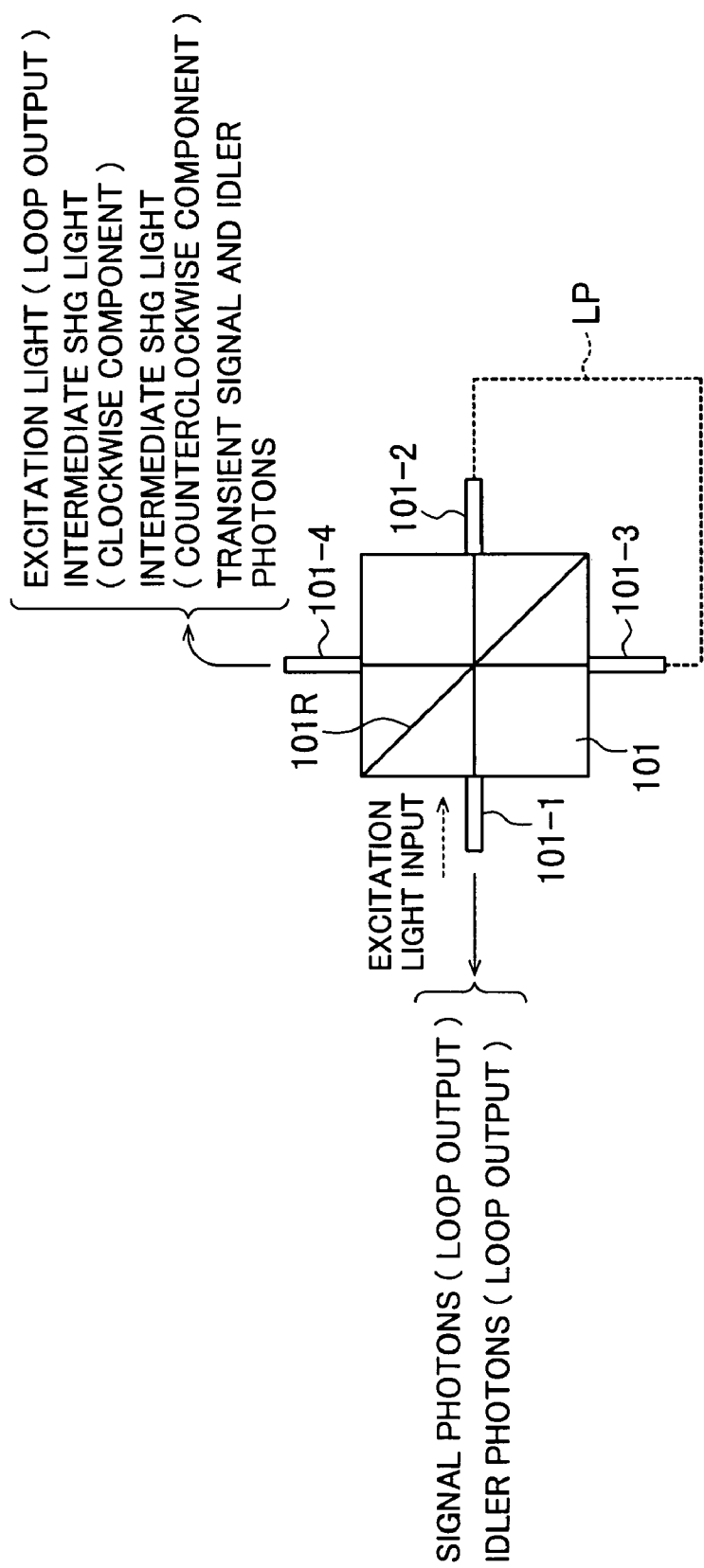
FIG. 13 schematically indicates the input and output ports for excitation light, SHG light, and signal and idler photons in the third embodiment.

The above operations are summarized in FIG. 13. The first input/output port 101-1 is used only for input of the excitation light to the optical loop LP and output of the desired signal and idler photon pairs from the optical loop LP. All other light exits from the fourth input/output port 101-4. The desired signal and idler photon pairs are separated from the input path by the optical circulator 106 in FIG. 11 and routed to receiving parties A and B by the WDM filter 108.

Since the desired quantum entangled photon pairs and the intermediate SHG light are output from separate ports, the optical low-pass filter 107 used in the preceding embodiments to reject the intermediate SHG light can in principle be omitted.

The variations of the first embodiment shown in FIGS. 5 and 6 can also be used in the third embodiment. That is, the optical circulator 106 may be eliminated and the excitation light may be input through the WDM filter 108 as in FIG. 5, or by use of an optical bandpass filter 110 as in FIG. 6. The same effects are obtained as in FIG. 11.

In addition to the effects produced by the first and second embodiments, the third embodiment produces the following effect. In principle, the optical low-pass filter for removing SHG light can be omitted, thereby reducing optical loss on the final output path. In practice, even if the polarization extinction ratio of the intermediate SHG light is not sufficiently high in the polarization splitting-combining module 101 and an optical low-pass filter 107 must be used to block residual intermediate SHG light, because the polarization splitting-combining module 101 is optimized for wavelength $\lambda_p$ and may not provide an assured polarization extinction ratio at wavelength $\lambda_p/2$, there is less residual intermediate SHG light than in the first and second embodiments, so the performance requirements for the optical low-pass filter 105 are relaxed and its cost can be reduced.

Fourth Embodiment

Figure 14:
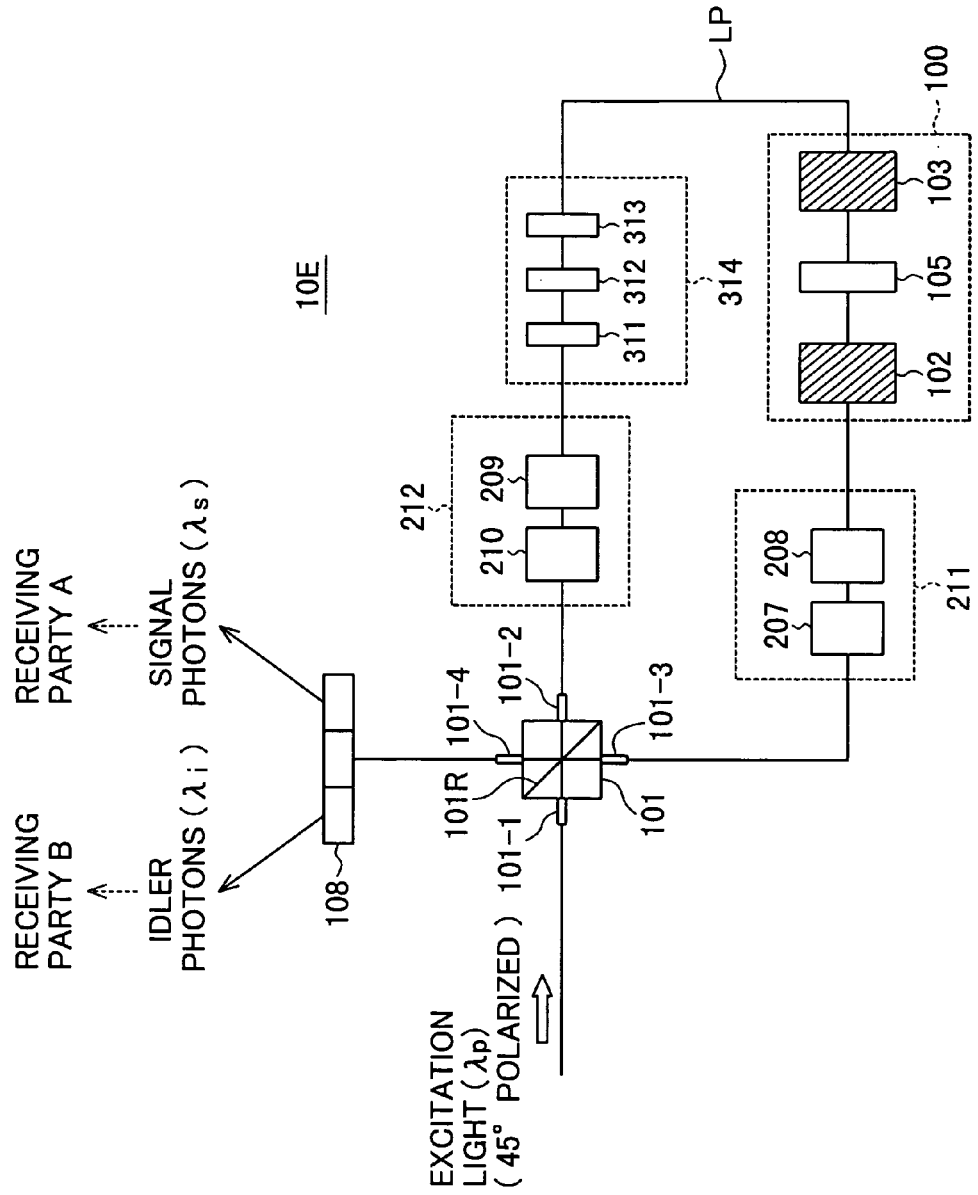
FIG. 14 schematically illustrates the structure of a polarization entangled photon pair generating device in a fourth embodiment of the invention.

Referring to FIG. 14, the fourth embodiment combines the structures of the second and third embodiments. Specifically, the quantum entangled photon pair generating device 10E in the fourth embodiment places the polarization converter 314 of the third embodiment between the second Faraday rotator 209 and the optical conversion generation unit 100 in the second embodiment. The half-wave plate 104 disposed between the third input/output port 101-3 of the polarization splitting-combining module 101 and the first Faraday rotator 207 in the third embodiment is not used. The optical low-pass filter 107 disposed between the fourth input/output port 101-4 and the WDM filter 108 in the second embodiment is unnecessary in principle, and is not shown in FIG. 14.

The operation of the quantum entangled photon pair generating device 10F in the fourth embodiment can be understood from the descriptions of the second and third embodiments. As in the second embodiment, 45° polarized excitation light is input to the first input/output port 101-1 of the polarization splitting-combining module 101 and returns to the first input/output port 101-1, accompanied by transient signal and idler photon pairs and clockwise-propagating intermediate SHG light, none of which are affected by the polarization converter 314. The desired SPDC correlated photon pairs generated in the optical conversion generation unit 100, which are also unaffected by the polarization converter 314, are output from the fourth input/output port 101-4. The p-polarized intermediate SHG light propagating counterclockwise from the optical conversion generation unit 100 undergoes 90° polarization rotations in both the polarization converter 314 and the second nonreciprocal polarization converter 212, enters the second input/output port 101-2 of the polarization splitting-combining module 101 as p-polarized light, and exits from the first input/output port 101-1.

Figure 15:
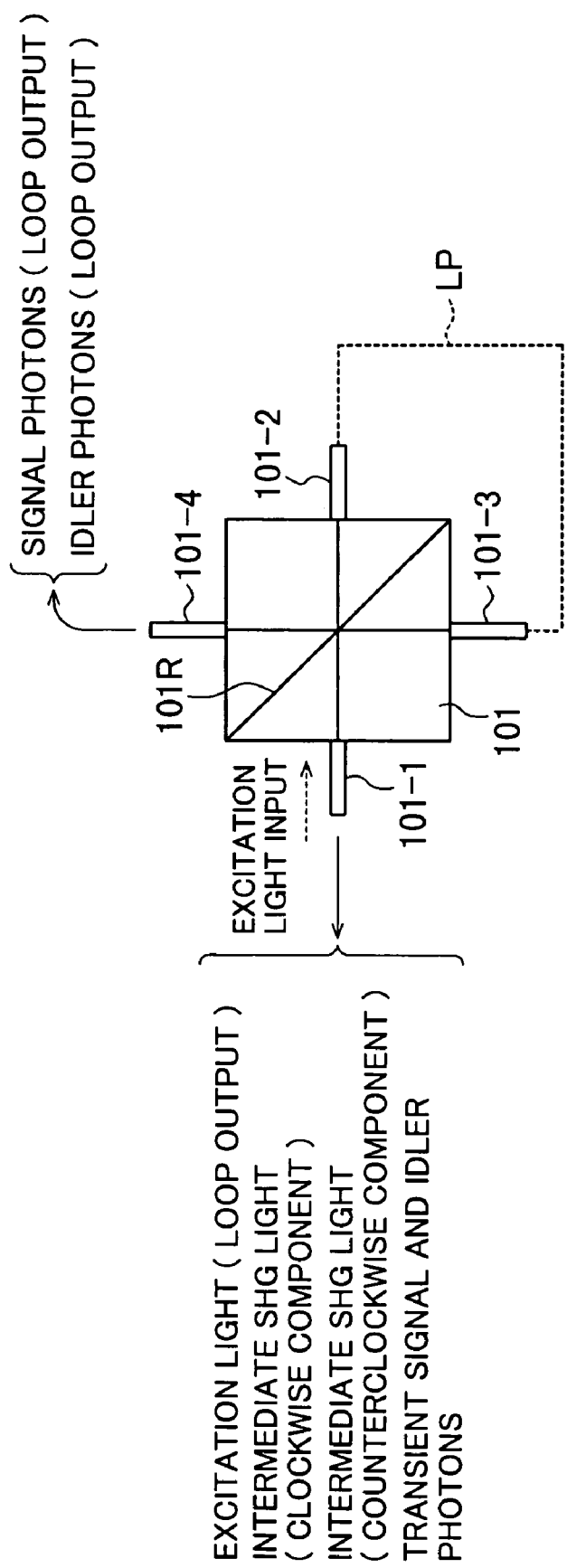
FIG. 15 schematically indicates the input and output ports for excitation light, SHG light, and signal and idler photons in the fourth embodiment.

This operation is summarized in FIG. 15. The desired signal and idler photon pairs are output from the fourth input/output port 101-4 of the polarization splitting-combining module 101. All other optical input and output takes place at the first input/output port 101-1. Compared with the third embodiment (FIG. 13), the roles of the first and fourth input/output ports 101-1, 101-4 as output ports are reversed.

By combining the effects of the second and third embodiments, in principle, the fourth embodiment eliminates the need for both an optical circulator on the input path and an optical low-pass filter on the desired output path, thereby reducing optical loss in the quantum entangled photon pair generating device.

If necessary, however, an optical circulator may be added to block excitation light from returning to its source (not shown), and an optical low-pass filter may be added to improve the purity of the quantum entangled photon pair output.

In the preceding embodiments have been described as using PPLN crystals as second-order nonlinear optical media, but as noted above, similar effects can also be produced with other second-order nonlinear optical media, including bulk crystal media, waveguide media having an optical waveguide structure similar to that of a PPLN waveguide, and various other media.

The position of the first half-wave plate 104 on the optical loop LP in the first and third embodiments is a design choice. When the $d_{11}$ component of the second-order nonlinear optical medium is used to produce the effects described in these embodiments, for example, the first half-wave plate 104 may be disposed between the optical conversion generation unit 100 and the second input/output port 101-2 of the polarization splitting-combining module 101. The preferred position of the first half-wave plate 104 depends on the orientation of the optical axes of the second-order nonlinear optical media in relation to the polarization direction of the excitation light. The locations of the polarization converter 314 and the nonreciprocal polarization converters 211 and 212 in the second to fourth embodiments can be selected depending on similar factors.

Those skilled in the art will recognize that further variations are possible within the scope of the invention, which is defined in the appended claims.

What is claimed is:

1. A quantum entangled photon pair generating device comprising:
    a polarization maintaining loop path;
    a loop input unit for receiving excitation light from a first optical path, separating the excitation light into a first excitation light component and a second excitation light component, the first excitation light component and the second excitation light component having mutually orthogonal polarization, feeding the first excitation light component into the polarization maintaining loop path in a clockwise direction, and feeding the second excitation light component into the polarization maintaining loop path in a counterclockwise direction;
    an optical conversion generation unit including a first second-order nonlinear optical medium disposed in the polarization maintaining loop path for generating first up-converted light from the first excitation light component by second harmonic generation, a second second-order nonlinear optical medium disposed in the polarization maintaining loop path for generating second up-converted light from the second excitation light component by second harmonic generation, and a first half-wave plate disposed in the polarization maintaining loop path between the first and second nonlinear optical media for rotating planes of polarization of the first and second excitation light components by ninety degrees, the second second-order nonlinear optical medium also generating first down-converted light from the first up-converted light by spontaneous parametric down-conversion, the first second-order nonlinear optical medium also generating second down-converted light from the second up-converted light by spontaneous parametric down-conversion, the first up-converted light and the first down-converted light propagating on the polarization maintaining loop path in the clockwise direction, the second up-converted light and the second down-converted light propagating on the polarization maintaining loop path in the counterclockwise direction;
    a loop output unit for receiving the first down-converted light and the second down-converted light from the polarization maintaining loop path, combining the first down-converted light and the second down-converted light to obtain combined light, and outputting the combined light on a second optical path; and
    a polarization manipulation unit for manipulating a polarization direction of at least one of the first excitation light component, the second excitation light component, the first down-converted light, and the second down-converted light, thereby causing the loop output unit to output the combined light as polarization entangled light.

2. The quantum entangled photon pair generating device of claim 1, wherein the first and second up-converted light and the first and second down-converted light are generated entirely by the optical conversion generation unit.

3. The quantum entangled photon pair generating device of claim 1, wherein a single polarization splitting-combining module is used as both the loop input unit and the loop output unit.

4. The quantum entangled photon pair generating device of claim 3, wherein the polarization manipulation unit is a second half-wave plate disposed in the polarization maintaining loop path to rotate a plane of polarization of the first down-converted light by ninety degrees.

5. The quantum entangled photon pair generating device of claim 4, wherein the first optical path and the second optical path share a common section, further comprising an optical circulator disposed at one end of the common section.

6. The quantum entangled photon pair generating device of claim 4, wherein the first optical path and the second optical path share a common section, further comprising a first wavelength selective filter disposed at an end of the common section to reflect one of the excitation light and the combined light and transmit another one of the excitation light and the combined light.

7. The quantum entangled photon pair generating device of claim 3, wherein the polarization manipulation unit further comprises:
    a first nonreciprocal polarization converter preceding the optical conversion generation unit in the counterclockwise direction on the polarization maintaining loop path, the first nonreciprocal polarization converter including a first Faraday rotator and a third half-wave plate, the first Faraday rotator preceding the third half-wave plate in the counterclockwise direction on the polarization maintaining loop path; and a second nonreciprocal polarization converter following the optical conversion generation unit in the counterclockwise direction on the polarization maintaining loop path, the second nonreciprocal polarization converter including a second Faraday rotator and a fourth half-wave plate, the second Faraday rotator preceding the fourth half-wave plate in the counterclockwise direction on the polarization maintaining loop path.

8. The quantum entangled photon pair generating device of claim 3, wherein the polarization manipulation unit further comprises:

a second half-wave plate following the optical conversion generation unit in the clockwise direction on the polarization maintaining loop path, for rotating a plane of polarization of the first down-converted light by ninety degrees; and a polarization converter following the optical conversion generation unit in the counterclockwise direction on the polarization maintaining loop path to rotate a plane of polarization of the second up-converted light by ninety degrees, the polarization converter including a fifth half-wave plate, a quarter-wave plate following the fifth half-wave plate in the clockwise direction on the polarization maintaining loop path, and a sixth half-wave plate following the quarter-wave plate in the clockwise direction on the polarization maintaining loop path.

9. The quantum entangled photon pair generating device of claim 8, wherein the first optical path and the second optical path share a common section, further comprising an optical circulator disposed at one end of the common section.

10. The quantum entangled photon pair generating device of claim 8, wherein the first optical path and the second optical path share a common section, further comprising a first wavelength selective filter disposed at an end of the common section to reflect one of the excitation light and the combined light and transmit another one of the excitation light and the combined light.

11. The quantum entangled photon pair generating device of claim 3, wherein the polarization manipulation unit further comprises:

a first nonreciprocal polarization converter preceding the optical conversion generation unit in the counterclockwise direction on the polarization maintaining loop path, the first nonreciprocal polarization converter including a first Faraday rotator and a third half-wave plate, the first Faraday rotator preceding the third half-wave plate in the counterclockwise direction on the polarization maintaining loop path;

a second nonreciprocal polarization converter following the optical conversion generation unit in the counterclockwise direction on the polarization maintaining loop path, the second nonreciprocal polarization converter including a second Faraday rotator and a fourth half-wave plate, the second Faraday rotator preceding the fourth half-wave plate in the counterclockwise direction on the polarization maintaining loop path; and a polarization converter disposed between the second nonreciprocal polarization converter and the optical conversion generation unit on the polarization maintaining loop path, the polarization converter including a fifth half-wave plate, a quarter-wave plate following the fifth half-wave plate in the clockwise direction on the polarization maintaining loop path, and a sixth half-wave plate following the quarter-wave plate in the clockwise direction on the polarization maintaining loop path.

12. The quantum entangled photon pair generating device of claim 1, further comprising a second wavelength selective filter having two output ports, disposed on the second optical path to reject the excitation light, output a signal wavelength component of the combined light from one of the two output ports, and output an idler wavelength component of the combined light from another one of the two output ports.

13. The quantum entangled photon pair generating device of claim 12, wherein the second wavelength selective filter comprises an arrayed waveguide grating.

14. The quantum entangled photon pair generating device of claim 1, further comprising an optical low-pass filter disposed on the second optical path to reject at least one of the first up-converted light and the second up-converted light.

* * * * *